US011609979B2

(12) United States Patent
Jung et al.

(10) Patent No.: US 11,609,979 B2
(45) Date of Patent: Mar. 21, 2023

(54) SECURE ELEMENT FOR PROCESSING AND AUTHENTICATING DIGITAL KEY AND OPERATION METHOD THEREFOR

(71) Applicant: Samsung Electronics Co., Ltd., Gyeonggi-do (KR)

(72) Inventors: Sooyeon Jung, Gyeonggi-do (KR); Inyoung Shin, Gyeonggi-do (KR); Jonghyo Lee, Gyeonggi-do (KR)

(73) Assignee: Samsung Electronics Co, , Ltd

( * ) Notice: Subject to any disclaimer, the term of this patent is extended or adjusted under 35 U.S.C. 154(b) by 0 days.

(21) Appl. No.: 17/259,843

(22) PCT Filed: Jul. 18, 2019

(86) PCT No.: PCT/KR2019/008900
§ 371 (c)(1),
(2) Date: Jan. 12, 2021

(87) PCT Pub. No.: WO2020/022700
PCT Pub. Date: Jan. 30, 2020

(65) Prior Publication Data
US 2021/0271743 A1 Sep. 2, 2021

(30) Foreign Application Priority Data
Jul. 24, 2018 (KR) .......................... 10-2018-0086275

(51) Int. Cl.
*G06F 21/33* (2013.01)
*H04L 9/32* (2006.01)
*H04L 9/08* (2006.01)

(52) U.S. Cl.
CPC ................ *G06F 21/33* (2013.01); *H04L 9/08* (2013.01); *H04L 9/3263* (2013.01)

(58) Field of Classification Search
CPC . G06F 21/33; G06F 21/31; H04L 9/08; H04L 9/3263; H04L 9/32; H04L 9/3273;
(Continued)

(56) References Cited

U.S. PATENT DOCUMENTS 9,646,165 B1 * 5/2017 Saylor ..................... E05B 45/06
9,786,108 B2 10/2017 Spiess et al.
(Continued)

FOREIGN PATENT DOCUMENTS

| KR | 1020130047803 | 5/2013 |
| KR | 10-1841145 | 5/2018 |
| KR | 1020180049421 | 5/2018 |

OTHER PUBLICATIONS

International Search Report dated Oct. 21, 2019 issued in counterpart application No. PCT/KR2019/008900, 16 pages.
(Continued)

*Primary Examiner* — Techane Gergiso
(74) *Attorney, Agent, or Firm* — The Farrell Law Firm, P.C.

(57) ABSTRACT

A secure element (SE) for processing a digital key includes a communication interface for communicating with a host, a memory for storing programs and data for processing the digital key, and a processor for executing the programs stored in the memory to receive a digital key processing request from a target device, determine whether a service is providable to the target device, by using a service-provider-specific service performance manager, process the digital key by using a digital key manager based on digital key processing information stored in the memory, upon determining that a service is providable to the target device, issue a digital key processing certificate by using the service-provider-specific service performance manager based on authentication information stored in the memory, and trans-
(Continued)

mit the digital key processing certificate to at least one of a service provider and the target device.

20 Claims, 11 Drawing Sheets

(58) Field of Classification Search
CPC ............... H04L 2209/80; H04L 9/0877; H04L 2209/84; H04L 9/3247; H04L 9/3242; G07C 9/00; G07C 2009/00825; G07C 2209/04; G07C 9/27; G07C 9/00857; G07C 2009/00317; G07C 2009/00325; G07C 2009/00333; G07C 2009/00341; G07C 2009/00349; G07C 2009/00357; G07C 2009/00507; G07C 2009/00515; G07C 2009/00523; G07C 2009/00531; G07C 2009/00539; G07C 2009/00547; H04W 12/069; H04W 12/041; H04W 12/043; H04W 4/44; H04W 4/46; B60R 25/2018; B60R 25/2036; G06Q 20/3821
See application file for complete search history.

(56) References Cited

U.S. PATENT DOCUMENTS

| | | | | |
|---|---|---|---|---|
| 2004/0070489 | A1* | 4/2004 | Ueda | E05B 85/01 340/5.72 |
| 2007/0200671 | A1* | 8/2007 | Kelley | B60R 25/257 455/420 |
| 2011/0213968 | A1* | 9/2011 | Zhang | H04L 67/12 713/158 |
| 2014/0049366 | A1 | 2/2014 | Vasquez | |
| 2014/0169564 | A1* | 6/2014 | Gautama | G07C 9/00309 380/270 |
| 2015/0095999 | A1* | 4/2015 | Toth | H04L 9/3263 726/6 |
| 2015/0119019 | A1 | 4/2015 | Minichmayr | |
| 2016/0012653 | A1* | 1/2016 | Soroko | G07C 9/20 340/5.61 |
| 2016/0094546 | A1* | 3/2016 | Innes | G06F 21/33 713/156 |
| 2016/0098870 | A1* | 4/2016 | Bergerhoff | H04W 4/48 340/5.61 |
| 2016/0285863 | A1* | 9/2016 | Canavor | H04W 12/069 |
| 2016/0318481 | A1* | 11/2016 | Penilla | H04W 4/44 |
| 2017/0101076 | A1* | 4/2017 | Krishnan | E05B 81/04 |
| 2017/0104589 | A1* | 4/2017 | Lambert | H04L 9/3268 |
| 2017/0178035 | A1* | 6/2017 | Grimm | H04L 9/3213 |
| 2017/0236343 | A1 | 8/2017 | Leboeuf et al. | |
| 2017/0282856 | A1* | 10/2017 | Riedel | B60R 25/24 |
| 2017/0309098 | A1* | 10/2017 | Watters | H04B 1/3822 |
| 2017/0374550 | A1 | 12/2017 | Auer | |
| 2018/0007059 | A1* | 1/2018 | Innes | G06F 21/6218 |
| 2018/0056936 | A1* | 3/2018 | Parasu | B60R 25/1001 |
| 2018/0060989 | A1* | 3/2018 | Hietanen | G06K 7/10722 |
| 2018/0099643 | A1* | 4/2018 | Golsch | H04W 4/30 |
| 2018/0130327 | A1* | 5/2018 | Rogers | B60N 2/002 |
| 2018/0186333 | A1* | 7/2018 | Santiano | H04W 12/08 |
| 2019/0123905 | A1* | 4/2019 | Kirner | H04L 9/3268 |
| 2019/0159026 | A1* | 5/2019 | Rezaei | H04L 63/0853 |
| 2020/0169422 | A1* | 5/2020 | Ingraham | H04L 9/085 |

OTHER PUBLICATIONS

European Search Report dated Jun. 25, 2021 issued in counterpart application No. 19839950.3-1218, 8 pages.
Korean Office Action dated Oct. 11, 2022 issued in counterpart application No. 10-2018-0086275, 18 pages.

* cited by examiner

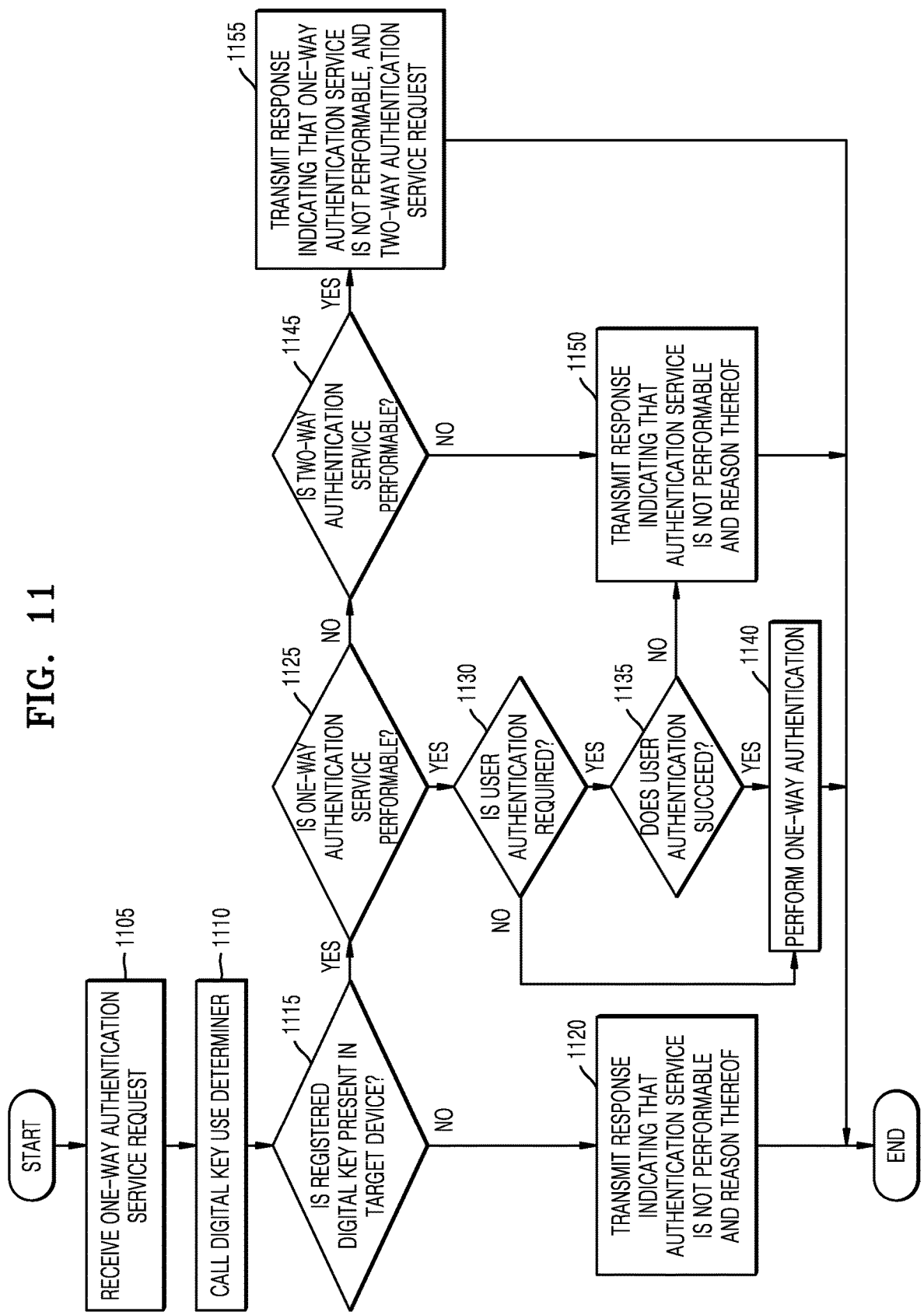

SECURE ELEMENT FOR PROCESSING AND AUTHENTICATING DIGITAL KEY AND OPERATION METHOD THEREFOR

PRIORITY

This application is a National Phase Entry of PCT International Application No. PCT/KR2019/008900 which was filed on Jul. 18, 2019, and claims priority to Korean Patent Application No. 10-2018-0086275, which was filed on Jul. 24, 2018, the content of each of which is incorporated herein by reference.

TECHNICAL HELD

The disclosure relates to a secure element (SE) for processing and authenticating a digital key, and a method of operating the same.

BACKGROUND ART

A technology for performing security and authentication services using digital keys is being developed due to the spread of personalized electronic devices such as smartphones and tablet personal computers (PCs). As an example of the digital key technology, a technology for integrating digital keys into mobile devices, e.g., smartphones, by using a wireless communication technology such as near field communication (NFC) is being developed. That is, a digitalized virtual key, i.e., a digital key, may be inserted into a mobile device, and a user of the mobile device may use the digital key instead of a physical key to open a door or perform a control and access function.

As such, use of digital keys may bring great improvement in user convenience and industrial effects but may also cause security problems. That is, digital keys basically need to be associated with electronic devices and thus may be exposed to malicious use, e.g., hacking of the electronic devices. Accordingly, a technology for securely storing a digital key in an electronic device is required.

In general, a digital key is serviced to be generated by a server of an external service provider and be unilaterally stored in a mobile device. This type of service puts a burden on the service provider in operating the server, requires application of a complex technology for enhancing security, and thus increases a time taken to process, e.g., generate, manage, remove, or use, the digital key. Therefore, a technology for providing a secure and fast service and reducing the burden on the service provider in operating the server is required.

DESCRIPTION OF EMBODIMENTS

Technical Problem

Provided are a secure element (SE) for processing and authenticating a digital key, and a method of operating the same.

Solution to Problem

According to an embodiment of the disclosure, a secure element (SE) for processing a digital key includes a communication interface for communicating with a host, a memory for storing programs and data for processing the digital key, and a processor for executing the programs stored in the memory to receive a digital key processing request from a target device, determine whether a service is providable to the target device, by using a service-provider-specific service performance manager, process the digital key by using a digital key manager based on digital key processing information stored in the memory, upon determining that a service is providable to the target device, issue a digital key processing certificate by using the service-provider-specific service performance manager based on authentication information stored in the memory, and transmit the digital key processing certificate to at least one of a service provider and the target device.

According to another embodiment of the disclosure, a method of operating a secure element (SE) to process a digital key includes receiving a digital key processing request from a target device, determining whether a service is providable to the target device, by using a service-provider-specific service performance manager, processing the digital key by using a digital key manager based on digital key processing information stored in a memory, upon determining that a service is providable to the target device, issuing a digital key processing certificate by using the service-provider-specific service performance manager based on authentication information stored in the memory, and transmitting the digital key processing certificate to at least one of a service provider and the target device.

According to another embodiment of the disclosure, a secure element (SE) for authenticating a digital key includes a communication interface for communicating with a host, a memory for storing programs and data for authenticating the digital key, and a processor for executing the programs stored in the memory to receive a digital key authentication request from a target device, determine whether a registered digital key is present in the target device, and perform an authentication procedure based on an authentication request type upon determining that a registered digital key is present in the target device.

According to another embodiment of the disclosure, a method of operating a secure element (SE) to authenticate a digital key includes receiving a digital key authentication request from a target device, determining whether a registered digital key is present in the target device, and performing an authentication procedure based on an authentication request type upon determining that a registered digital key is present in the target device.

According to another embodiment of the disclosure, a computer program product includes a recording medium having stored therein a program instructing to receive a digital key processing request from a target device, determine whether a service is providable to the target device, by using a service-provider-specific service performance manager, process the digital key by using a digital key manager based on digital key processing information stored in a memory, upon determining that a service is providable to the target device, issue a digital key processing certificate by using the service-provider-specific service performance manager based on authentication information stored in the memory, and transmit the digital key processing certificate to at least one of a service provider and the target device.

According to another embodiment of the disclosure, a computer program product includes a recording medium having stored therein a program instructing to receive a digital key authentication request from a target device, determine whether a registered digital key is present in the target device, and perform an authentication procedure based on an authentication request type upon determining that a registered digital key is present in the target device.

Advantageous Effects of Disclosure

According to an embodiment of the disclosure, a secure element (SE) for processing and authenticating a digital key, and a method of operating the same may be provided.

BRIEF DESCRIPTION OF DRAWINGS

FIG. 11 is a flowchart of a method of operating a SE to one-way-authenticate a digital key, according to an embodiment.

BEST MODE

Figure 1:
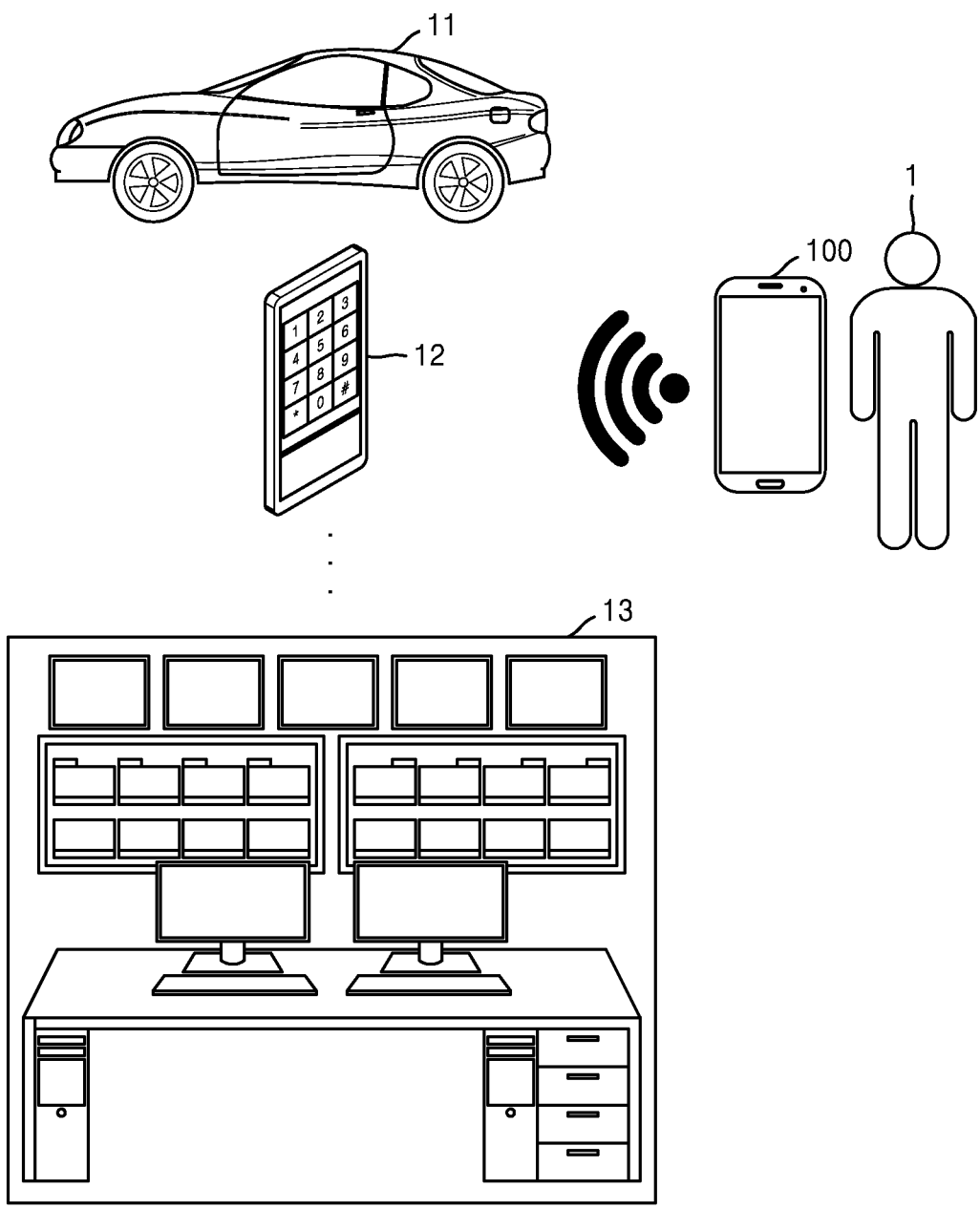
FIG. 1 is a diagram for describing an environment to which a digital key is applicable.

According to an embodiment of the disclosure, a secure element (SE) for processing a digital key includes a communication interface for communicating with a host, a memory for storing programs and data for processing the digital key, and a processor for executing the programs stored in the memory to receive a digital key processing request from a target device, determine whether a service is providable to the target device, by using a service-provider-specific service performance manager, process the digital key by using a digital key manager based on digital key processing information stored in the memory, upon determining that a service is providable to the target device, issue a digital key processing certificate by using the service-provider-specific service performance manager based on authentication information stored in the memory, and transmit the digital key processing certificate to at least one of a service provider and the target device.

The processing of the digital key may include at least one of generating, removing, and managing the digital key.

The processor may determine whether a service is providable to the target device, by determining at least one of whether the authentication information of the service provider for the target device is stored in the SE, whether the authentication information of the service provider is valid, whether the target device is a valid target device, and whether a user of the target device is a valid user.

The digital key processing information may include at least one of attribute information including at least one of a valid time, a valid area, authority, and personal setting information for the target device, and identification information of the digital key, and the authentication information may include a key pair for a certificate including a public key and a private key of the service provider, and service operation data of the service provider including at least one of identification information of the service provider, a public key, and a root certificate of a service provider server.

The processor may transmit the digital key processing certificate to an entity other than the service provider and the target device, based on at least one of the authentication information and the digital key processing information.

When a request to integrally process digital keys of the service provider stored in the memory is received, the processor may determine whether integral processing is enabled, by using the service-provider-specific service performance manager, integrally process the digital keys of the service provider stored in the memory, by using the digital key manager upon determining that integral processing is enabled, issue an integral processing certificate by using the service-provider-specific service performance manager, and transmit the integral processing certificate to the service provider.

According to another embodiment of the disclosure, a method of operating a secure element (SE) to process a digital key includes receiving a digital key processing request from a target device, determining whether a service is providable to the target device, by using a service-provider-specific service performance manager, processing the digital key by using a digital key manager based on digital key processing information stored in a memory, upon determining that a service is providable to the target device, issuing a digital key processing certificate by using the service-provider-specific service performance manager based on authentication information stored in the memory, and transmitting the digital key processing certificate to at least one of a service provider and the target device.

The processing of the digital key may include at least one of generating, removing, and managing the digital key.

The determining of whether a service is providable to the target device may include determining at least one of whether the authentication information of the service provider for the target device is stored in the SE, whether the authentication information of the service provider is valid, whether the target device is a valid target device, and whether a user of the target device is a valid user.

The digital key processing information may include at least one of attribute information including at least one of a valid time, a valid area, authority, and personal setting information for the target device, and identification information of the digital key, and the authentication information may include a key pair for a certificate including a public key and a private key of the service provider, and service operation data of the service provider including at least one of identification information of the service provider, a public key, and a root certificate of a service provider server.

The method may further include transmitting the digital key processing certificate to an entity other than the service provider and the target device, based on at least one of the authentication information and the digital key processing information.

When a request to integrally process digital keys of the service provider stored in the memory is received, the method may further include determining whether integral processing is enabled, by using the service-provider-specific service performance manager, integrally processing the digital keys of the service provider stored in the memory, by using the digital key manager upon determining that integral processing is enabled, issuing an integral processing certificate by using the service-provider-specific service performance manager, and transmitting the integral processing certificate to the service provider.

According to another embodiment of the disclosure, a secure element (SE) for authenticating a digital key includes a communication interface for communicating with a host, a memory for storing programs and data for authenticating the digital key, and a processor for executing the programs stored in the memory to receive a digital key authentication request from a target device, determine whether a registered digital key is present in the target device, and perform an authentication procedure based on an authentication request type upon determining that a registered digital key is present in the target device.

When the digital key authentication request received from the target device is a one-way authentication request, the processor may determine whether one-way authentication is performable, and perform one-way authentication upon determining that one-way authentication is performable.

The processor may determine whether two-way authentication is performable, upon determining that one-way authentication is not performable, and transmit a two-way authentication request to the target device upon determining that two-way authentication is performable.

The processor may perform user authentication, and terminate the authentication procedure when user authentication fails.

According to another embodiment of the disclosure, a method of operating a secure element (SE) to authenticate a digital key includes receiving a digital key authentication request from a target device, determining whether a registered digital key is present in the target device, and performing an authentication procedure based on an authentication request type upon determining that a registered digital key is present in the target device.

The receiving of the digital key authentication request may include receiving a one-way authentication request, and the performing of the authentication procedure based on the authentication request type may include determining whether one-way authentication is performable, and performing one-way authentication upon determining that one-way authentication is performable.

The performing of the authentication procedure based on the authentication request type may include determining whether two-way authentication is performable, upon determining that one-way authentication is not performable, and transmitting a two-way authentication request to the target device upon determining that two-way authentication is performable.

The method may further include performing user authentication, and terminating the authentication procedure when user authentication fails.

According to another embodiment of the disclosure, a computer program product includes a recording medium having stored therein a program instructing to receive a digital key processing request from a target device, determine whether a service is providable to the target device, by using a service-provider-specific service performance manager, process the digital key by using a digital key manager based on digital key processing information stored in a memory, upon determining that a service is providable to the target device, issue a digital key processing certificate by using the service-provider-specific service performance manager based on authentication information stored in the memory, and transmit the digital key processing certificate to at least one of a service provider and the target device.

According to another embodiment of the disclosure, a computer program product includes a recording medium having stored therein a program instructing to receive a digital key authentication request from a target device, determine whether a registered digital key is present in the target device, and perform an authentication procedure based on an authentication request type upon determining that a registered digital key is present in the target device.

Mode of Disclosure

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executed by one or more processors. Furthermore, the disclosure may employ known technologies for electronic settings, signal processing, and/or data processing.

In addition, connection lines or connection members between elements illustrated in the drawings merely indicate functional connections and/or physical or circuit connections. Connections between elements may be represented by various replaceable or additional functional connections, physical connections, or circuit connections in an actual apparatus.

As used herein, the term ". . . unit" or "module" denotes an entity for performing at least one function or operation, and may be implemented using hardware, software, or a combination thereof. The "unit" or "module" may also be implemented as a program stored in an addressable storage medium and executable by a processor. For example, the term "unit" or "module" may be implemented as elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

FIG. 1 is a diagram for describing an environment to which a digital key is applicable.

Referring to FIG. 1, an electronic device 100, a user 1 of the electronic device 100, and target devices 11, 12, . . . , and 13 to be controlled and accessed using digital keys included in the electronic device 100 are illustrated.

The electronic device 100 may include a personalized mobile device, but is not limited thereto and may include various types of electronic devices. For example, the electronic device 100 may include a smartphone, a personal computer (PC), a tablet PC, a camera, and a wearable device. In an embodiment, the electronic device 100 may include a secure element (SE), and the SE may process, e.g., generate, remove, and manage, digital keys for controlling and accessing the target devices 11, 12, . . . , and 13, and authenticate the digital keys.

The target devices 11, 12, . . . , and 13 may perform an operation for generating digital keys in association with the electronic device 100, and be controlled and accessed using the digital keys generated as described above and stored in the SE of the electronic device 100.

For example, when a vehicle 11 is a target device, the user 1 may generate a digital key via the electronic device 100 in association with the vehicle 11, and store the generated digital key in the SE of the electronic device 100. The user 1 may control various operations of the vehicle 11 by using the digital key stored in the SE of the electronic device 100. For example, the user 1 may open doors, start an engine, and control various electronic devices included in the vehicle 11, by using the digital key. Furthermore, the user 1 may control operations related to autonomous driving, e.g., automatic parking. The user 1 may lock or unlock a locking device by using the digital key when a door lock 12 is a target device, and may be authenticated using the digital key and be granted with a different level of authority depending on the authenticated user 1 when a control system 13 is a target device.

The embodiments illustrated in FIG. 1 are merely examples and the scope of the disclosure is not limited thereto. For example, in addition to the target devices 11, 12, . . . , and 13 illustrated in FIG. 1, various other target devices may be present.

Figure 2:
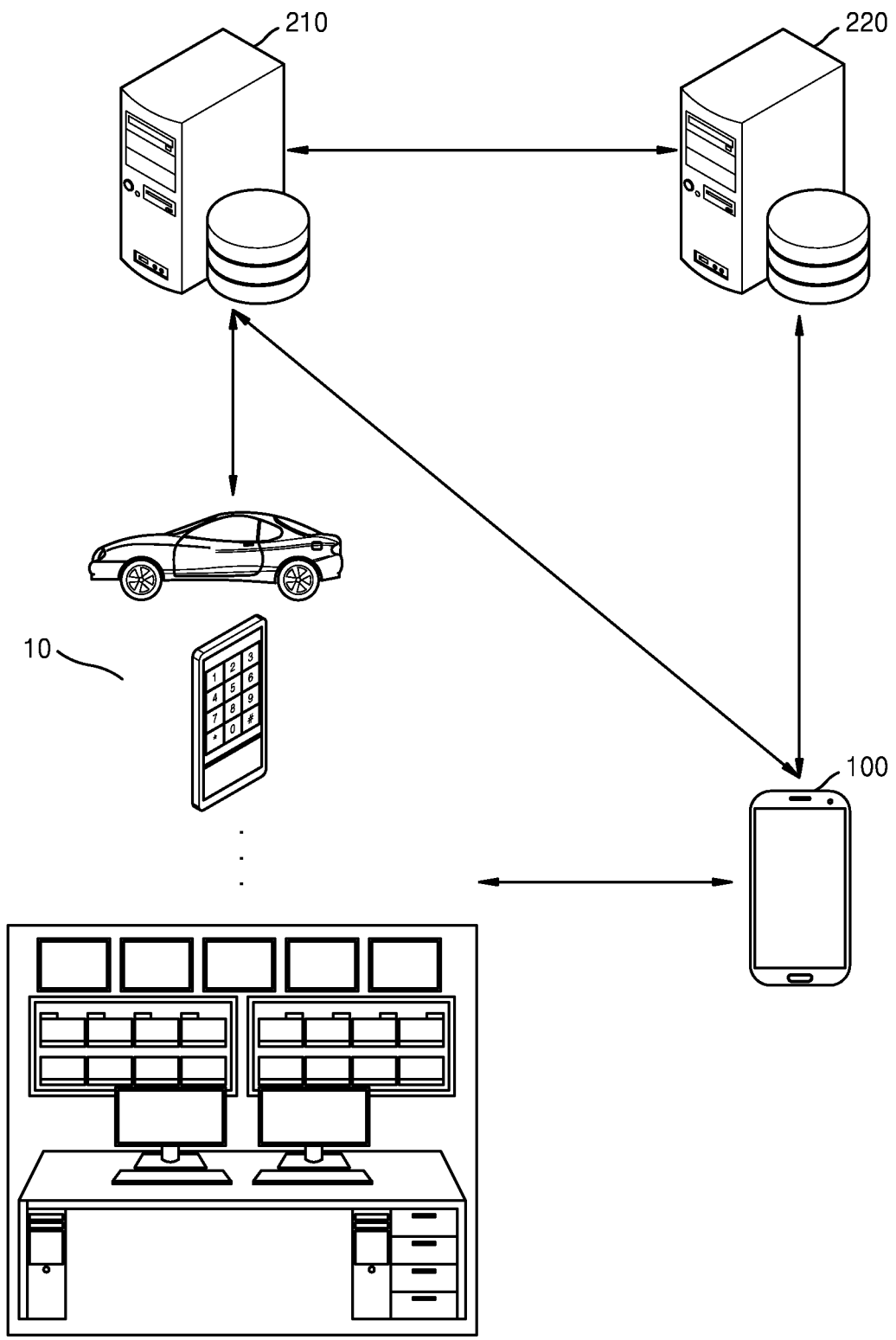
FIG. 2 is a diagram for describing a system for implementing a service using a digital key.

FIG. 2 is a diagram for describing a system for implementing a service using a digital key.

Referring to FIG. 2, a service provider server 210, a digital key service manager server 220, the electronic device 100, and a target device 10 are illustrated.

The service provider server 210 is a server of a service provider who desires to provide a digital key service to the user 1. The service provider refers to a business operator for providing a service related to, for example, vehicles, hotels, houses, or buildings, and may provide the digital key service to the user 1 as an additional service added to the main service. For example, a vehicle company sells vehicles and a hotel, house, or building company provides a service related to hotels, houses, or buildings. The service provider may provide the digital key service for an access function such as door opening, engine starting, or control.

The service provider server 210 may include a user information database including user account information such as an identifier (ID) and a password of the user 1, and sold product or service information. For example, when a vehicle is sold, the automobile company may store an ID and a password of the user 1, an identification number of the sold vehicle, and information indicating whether the digital key service is used.

The digital key service manager server 220 provides a technology and service capable of securely issuing and storing a digital key in the electronic device 100. For example, when the user 1 purchases a vehicle and desires to store a digital key in the electronic device 100, the digital key service manager server 220 may determine whether the user 1 is a valid user and the vehicle is a valid vehicle, generate and store a digital key in the electronic device 100, and manage the stored digital key.

The target device 10 is an entity corresponding to a product and service sold by the service provider to the user 1. For example, the target device 10 may include a gate of a vehicle, a hotel, a house, or a building. Specifically, in regard to the vehicle, the target device 10 may include not only a vehicle door and a tailgate but also an access gate for starting an engine and controlling the vehicle.

As described above, the electronic device 100 may include various types of electronic devices. In an embodiment, the electronic device 100 may include a SE, and the SE may process, e.g., generate, remove, and manage, a digital key for controlling and accessing the target devices 11, 12, . . . , and 13, and authenticate the digital key. Furthermore, the SE may authenticate access of an external entity such as the service provider server 210 to the digital key and check authority, thereby providing a function of securely managing the digital key.

FIG. 2 merely illustrates an example of a system for implementing a service using a digital key, and the service using the digital key is not limited thereto and may be implemented in various manners.

Figure 3:
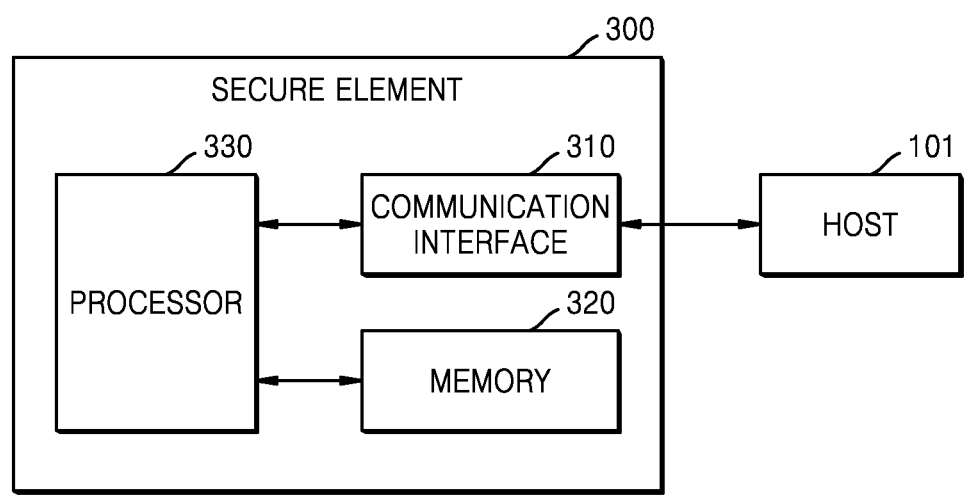
FIG. 3 is a block diagram of a secure element (SE) according to an embodiment.

FIG. 3 is a block diagram of a SE 300 according to an embodiment.

Referring to FIG. 3, the SE 300 may include a communication interface 310, a memory 320, and a processor 330.

The SE 300 is an independent secure storage device of the electronic device 100 and is a secure area accessible only by authenticated applications. The SE 300 may be configured to be physically isolated from other hardware elements. In an embodiment, the SE 300 may include, for example, an embedded secure element (eSE), a universal integrated circuit card (UICC), a secure digital (SD) card, or an embedded UICC (eUICC), but is not limited thereto.

The communication interface 310 may communicate with a host 101. In an embodiment, the communication interface 310 may include at least one of various wired and wireless communication interfaces for communicating with the host 101. Herein, the host 101 may be one of devices included in the electronic device 100, e.g., an application processor (AP) or a memory. The communication interface 310 may be, for example, a serial interface such as an ISO 7816 interface, a universal serial bus (USB) interface, an inter-integrated circuit ($I^2C$) interface, a serial peripheral interface (SPI), or a single wire protocol (SWP) interface, or an arbitrary serial interface generally used for communication between two hardware devices. Alternatively, the communication interface 310 may be a wireless interface for directly connecting an antenna to a hardware device, e.g., an ISO 14443 interface, a Zigbee interface, or a Bluetooth interface. Furthermore, the communication interface 310 may be a parallel interface connected to a central bus of the electronic device 100 and, in this case, the communication interface 310 may include a buffer for receiving commands and data from the host 101.

Programs such as applications and various types of data such as files may be installed and stored in the memory 320. The processor 330 may access and use the data stored in the memory 320, or store new data in the memory 320. In an embodiment, programs and data for processing and authenticating a digital key may be installed and stored in the memory 320.

The processor 330 may control overall operations of the SE 300, and include at least one processor such as a central processing unit (CPU) or a graphics processing unit (GPU). The processor 330 may control the other elements included in the SE 300 to process and authenticate the digital key. For example, the processor 330 may execute the programs stored in the memory 320, read the files stored in the memory 320, or store new files in the memory 320. In an embodiment, the processor 330 may execute the programs stored in the memory 320 to process and authenticate the digital key.

In an embodiment, the processor 330 may receive a digital key processing request from a target device, determine whether a service is providable to the target device, by using a service-provider-specific service performance manager, process the digital key by using a digital key manager based on digital key processing information stored in the memory 320, upon determining that a service is providable to the target device, issue a digital key processing certificate by using the service-provider-specific service performance manager based on authentication information stored in the memory 320, and transmit the digital key processing certificate to at least one of a service provider and the target device. Herein, the processing of the digital key may include generating, removing, or managing the digital key. The digital key processing information may include attribute information including a valid time, a valid area, authority, or personal setting information for the target device, and identification information of the digital key including an ID of the digital key. Furthermore, the authentication information may include a key pair for a certificate including a public key and a private key of the service provider, and service operation data of the service provider including identification information of the service provider, a public key, or a root certificate of a service provider server.

In an embodiment, the processor 330 may determine whether a service is providable to the target device, by determining whether the authentication information of the service provider for the target device is stored in the SE 300, whether the authentication information of the service provider is valid, whether the target device is a valid target device, or whether a user of the target device is a valid user. The processor 330 may transmit the digital key processing certificate to an entity other than the service provider and the target device, based on the authentication information and the digital key processing information. Herein, the other entity may include a service provider server, an electronic device manufacturer server, a SE manager server, or a digital key application manager server.

Furthermore, when a request to integrally process digital keys of the service provider stored in the memory 320 is received, the processor 330 may determine whether integral processing is enabled, by using the service-provider-specific service performance manager, integrally process the digital keys of the service provider stored in the memory 320, by using the digital key manager upon determining that integral processing is enabled, issue an integral processing certificate by using the service-provider-specific service performance manager, and transmit the integral processing certificate to the service provider.

According to an embodiment, by assigning the service-provider-specific service performance manager to provide a digital key service to service providers, and processing digital keys of the service providers via the service-provider-specific service performance manager, even when a common area is used, the SE 300 may provide independent services to the service providers. According to an embodiment, by isolating the service-provider-specific service performance manager 435 for providing a digital key processing service to service providers, from the digital key manager 436 for generating, removing, managing, and modifying digital keys in the SE 300, even when a service using a digital key occurs regardless of a request of a service provider, the service using the digital key may be processed in the SE 300 and then a certificate capable of proving a service performance history may be issued and transmitted to the service provider by using the service-provider-specific service performance manager, thereby integrally managing and synchronizing all services without direct involvement of the service providers.

In another embodiment, the processor 330 may receive a digital key authentication request from the target device, determine whether a registered digital key is present in the target device, and perform an authentication procedure based on an authentication request type upon determining that a registered digital key is present in the target device. Herein, the authentication request may include types such as fast transaction, standard transaction, internal authentication, and mutual authentication.

The processor 330 determines whether a digital key usable for an authentication procedure is present. In an embodiment, the processor 330 may determine whether a registered digital key is present in the target device, by using a digital key use determiner 437. In this case, the digital key use determiner 437 may determine whether a registered digital key is present in the target device, based on data included in a digital key management table 453. For example, when identification information of a service requester is given, the digital key use determiner 437 may search for a digital key corresponding to the identification information of the service requester.

In an embodiment, upon determining that a registered digital key is present in the target device, the digital key use determiner 437 may additionally determine a status of the digital key to determine whether the digital key is usable. For example, the digital key use determiner 437 may determine the status of the digital key based on status information included in the digital key management table 453. Herein, the status information may include information indicating whether the digital key is locked. In addition, the status information may include information about security validity of the digital key and a valid duration of the digital key.

When the digital key authentication request received from the target device is a one-way authentication request, the processor 330 may determine whether one-way authentication is performable, and perform one-way authentication upon determining that one-way authentication is performable. In an embodiment, the processor 330 may determine whether one-way authentication is performable, by using the digital key use determiner 437. The digital key use determiner 437 may determine whether one-way authentication is performable, based on status information included in the digital key management table 453. Herein, the status information may include information indicating whether the digital key is locked. In addition, the status information may include the number of times that one-way authentication is performed, the number of times that one-way authentication is performable, or information indicating whether one-way authentication is locked.

The processor 330 may determine whether two-way authentication is performable, upon determining that one-way authentication is not performable, and transmit a two-way authentication request to the target device upon determining that two-way authentication is performable. In an embodiment, the processor 330 may determine whether two-way authentication is performable, by using the digital key use determiner 437. The digital key use determiner 437 may determine whether two-way authentication is performable, based on status information included in the digital key management table 453. Herein, the status information may include information indicating whether the digital key is locked. In addition, the status information may include information about security validity of the digital key and a valid duration of the digital key.

Furthermore, the processor 330 may perform user authentication, and stop the authentication procedure when user authentication fails. In an embodiment, the processor 330 may request a service framework 410 to perform user authentication and then receive a user authentication result from the service framework 410. Herein, user authentication may be performed in any stage during the authentication procedure. For example, upon determining that a registered digital key is present and the digital key is usable, user authentication may be performed to stop or continue the authentication procedure.

According to an embodiment, when a service such as authentication is to be used by using a digital key, an optimized authentication service may be provided by proactively determining requirements for using the digital key.

Figure 4:
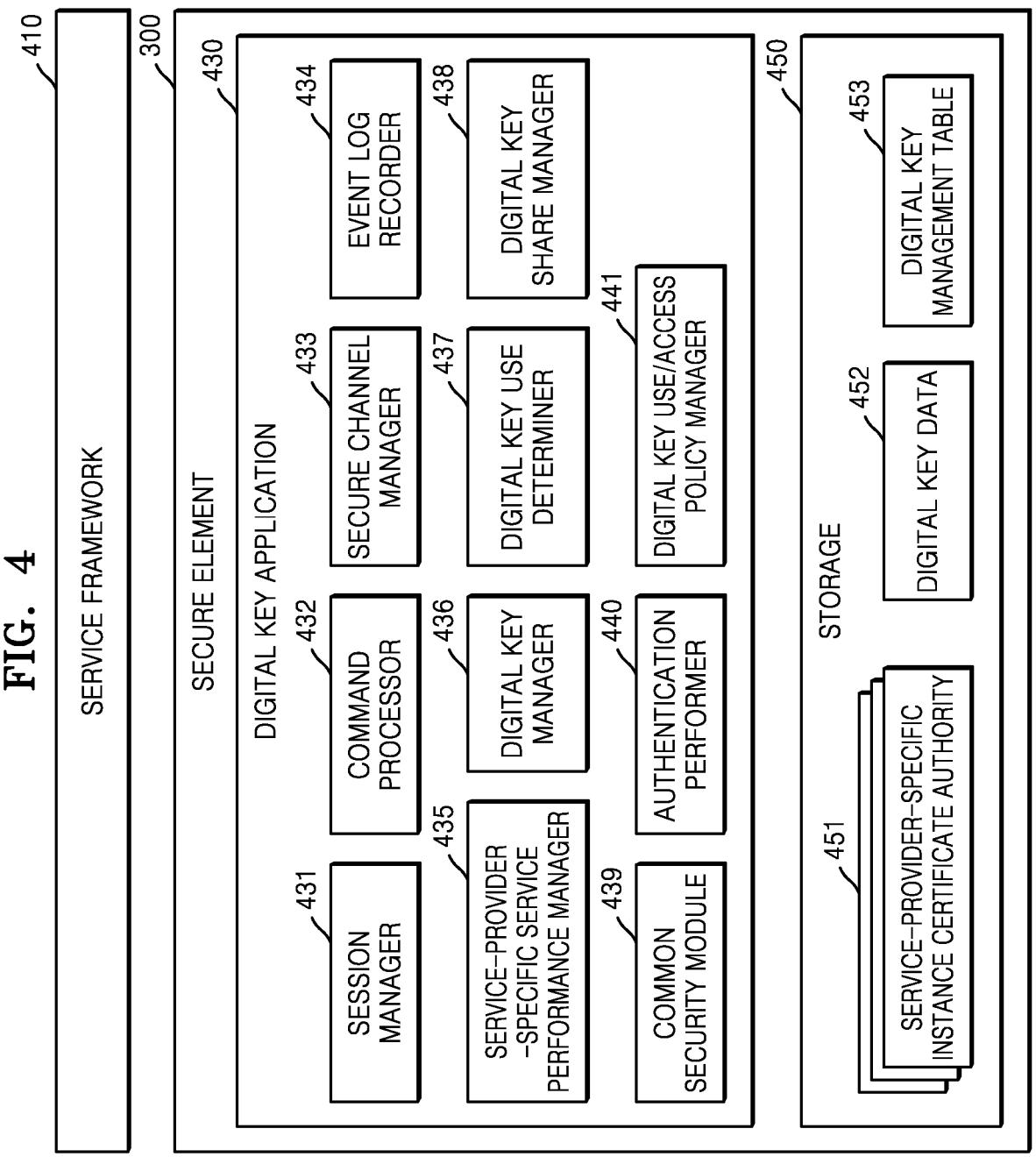
FIG. 4 is a block diagram showing a system architecture of an electronic device including a SE, according to an embodiment.

FIG. 4 is a block diagram showing a system architecture of the electronic device 100 including the SE 300, according to an embodiment.

Referring to FIG. 4, the electronic device 100 includes a digital key service framework 410 and the SE 300.

The service framework 410 is a service application serving as a gateway when an access from an external entity to the SE 300 occurs. The service framework 410 may provide an application programming interface (API) accessible by the external entity, and provide functions such as access control and command transformation to the SE 300. The external entity may include, for example, a user application installed in an operating system (e.g., Android or iOS) of a mobile device, or an external server.

The SE 300 is an independent secure storage device of the electronic device 100 and is a secure area accessible only by authenticated applications. The SE 300 may be configured to be physically isolated from other hardware elements. In an embodiment, the SE 300 may include, for example, an embedded secure element (eSE), a universal integrated circuit card (UICC), a secure digital (SD) card, or an embedded UICC (eUICC), but is not limited thereto.

A digital key application 430 is a lightweight application installed and driven in the SE 300. The digital key application 430 may generate and store digital keys in a storage 450 of the SE 300, and commonly provide use, removal, and management services to a plurality of service providers. The digital key application 430 may be previously embedded in the SE 300, or be loaded or installed later when required.

Referring to FIG. 4, the digital key application 430 may include a session manager 431, a command processor 432, a secure channel manager 433, an event log recorder 434, a service-provider-specific service performance manager 435, a digital key manager 436, a digital key use determiner 437, a digital key share manager 438, a common security module 439, an authentication performer 440, and a digital key use/access policy manager 441. The storage 450 in the SE 300 may store a plurality of service-provider-specific instance certificate authorities (CAs) 451 each including operation data and a key pair for a certificate per service provider, digital key data 452, and a digital key management table 453.

Each element will now be described in detail. However, the elements of the digital key application 430 illustrated in FIG. 4 are merely examples, and the digital key application 430 may be configured in various manners to, for example, include only some elements or further include other elements. For example, the digital key application 430 may not include the common security module 439.

The session manager 431 establishes, releases, or maintains a session for communicating with an external device. The command processor 432 receives, processes (e.g., parses), and interprets a command and connects the same to an element appropriate to execute the command (e.g., a processor or a determiner). When a secure channel is required, the secure channel manager 433 generates a temporary key pair, calculates a session key, an encryption key, and a message authentication code (MAC) key by using a key exchange algorithm, and performs secure transmission by using the calculated keys (herein, secure transmission includes encrypting a data part of a message to be transmitted, decrypting a data part of a received command, or generating or verifying MAC).

When an event such as generation, removal, modification, or use of a digital key occurs in the digital key application 430, the event log recorder 434 records the event.

The service-provider-specific service performance manager 435 provides digital key generation, removal, and management services per service provider. The service-provider-specific service performance manager 435 generates a key pair for a certificate per service provider, generates service operation data or receives service operation data from a service requester, and stores the same in the storage 450 upon request of an electronic device manufacturer, a SE manager, or a digital key application manager.

Herein, the key pair for a certificate is a pair of a public key and a private key based on a symmetric key system. The service operation data may include the name of a service provider, a public key, or a root certificate of a service provider server. The service-provider-specific service performance manager 435 may generate, remove, or modify a digital key by using the digital key manager 436 and generate confirmation information (e.g., a certificate, a confirmation, a receipt, or a token) about the result of the service upon request of the service provider or an entity authorized by the service provider (e.g., a target entity for which the digital key is usable, such as, a vehicle, a vehicle door, a building door, or a hotel door). The service-provider-specific service performance manager 435 adds a signature to the confirmation information about the result of the service performed using the key pair for a certificate of the service provider. Herein, the signature may include a signature using a private key for the service provider, or encryption using a key previously shared with the service provider. The service-provider-specific service performance manager 435 may transmit the signed confirmation information (e.g., a signed service result confirmation) to the service requester. When the service requester differs from the service provider, for example, when the service requester is an entity authorized by the service provider, the service-provider-specific service performance manager 435 may transmit the signed confirmation information to the service provider.

The digital key manager 436 generates the digital key upon request of the service-provider-specific service performance manager 435. Herein, the digital key includes a newly generated public key and private key, and attribute information of the digital key. The attribute information may include a valid time, a valid area, or permitted authority (e.g., in regard to a vehicle, door opening, trunk opening, and engine starting) of the digital key. In addition, the attribute information may include a nickname assigned to the generated digital key, and setting information of a user of the digital key (e.g., in regard to a vehicle, personal vehicle setting information such as a preferred seat position, a rear-view mirror position, and preferred radio channels). The digital key manager 436 may additionally store or remove critical information dependent on a specific digital key upon request of the service requester. Herein, the critical information includes information required to start an engine of a vehicle, e.g., an immobilizer token.

When a service use request for performing authentication by using the digital key occurs, the digital key use determiner 437 determines validity of the service use request and provides an appropriate response. Herein, the appropriate response may include data for authentication, a response indicating that authentication is not performable and a reason thereof, or a proposal for a different type of authentication than the requested authentication. When a service use request of an external service requester occurs, the digital key use determiner 437 determines whether a usable digital key is present and a restriction in use is not present for the service requester stored in the digital key management table 453 via the digital key use/access policy manager 441.

Herein, the service use request includes types such as fast transaction, standard transaction, internal authentication, and mutual authentication. One-way authentication may include symmetric-key-based authentication using a value previously shared between the service requester and the digital key, and two-way authentication may include asymmetric-key-based mutual authentication. Internal authentication is one-way authentication by which the electronic device 100 transmits, to the service requester, information proving that the electronic device 100 has a digital key corresponding to the service requester, and thus the service requester may prove that the electronic device 100 has the digital key corresponding to the service requester, and mutual authentication is two-way authentication performed by the service requester and the electronic device 100 based on asymmetric keys.

The digital key use determiner 437 generates a response corresponding to the received use request and transmits the response to the service requester upon determining that a restriction in use is not present. Herein, the restriction in use may include information indicating whether the digital key is locked by a service provider, an electronic device manufacturer, a SE manager, or a digital key application manager, the number of valid uses of the digital key, and a requirement of user authentication before using the digital key. When the requested use service is not providable due to the restriction in use, the digital key use determiner 437 may generate a response including a reason that the service is not providable, and transmit the response to the service requester. The digital key use determiner 437 generate a response for proposing a different type of authentication than requested authentication, and transmit the response to the service requester.

When authority applied to a specific digital key stored in the storage 450 is to be shared with (or transferred to) a digital key in a SE of another electronic device, the digital key share manager 438 executes a protocol for sharing, and manages information of the electronic device to be shared, and a sharing history.

The common security module 439 includes security algorithms commonly used for encryption, decryption, signature generation, and MAC generation. The common security module 439 may be omitted when the SE 300 provides a common security module. The commonly used security algorithms may include advanced encryption standard (AES), triple data encryption standard (3-DES), elliptic curve cryptography (ECC), and Rivest-Shamir-Adleman (RSA) algorithms.

The authentication performer 440 provides a security service for authentication by using the common security module 439 upon request of the service-provider-specific service performance manager 435 or the digital key use determiner 437. Herein, the security service includes services such as challenge generation, challenge response verification, signature generation using a specific key, signature verification using a specific key, encryption using a specific key, decryption using a specific key, hash value generation using a specific key, hash value verification using a specific key, and authentication token generation using a specific key.

The digital key use/access policy manager 441 stores information about an external entity authorized to access and use the digital key, and requirements for using the digital key, in the digital key management table 453 whenever the digital key is generated, manages update and removal thereof, and provides a service of searching the digital key management table 453. The external entity includes a service provider, a user application installed in an operating system (e.g., Android or iOS) of a mobile device, an external server, an electronic device manufacturer, a SE manager, a digital key application manager, or an entity having received authority of the service provider (e.g., a target entity for which the digital key is usable, such as, a vehicle, a vehicle door, a building door, or a hotel door). The requirements for using the digital key include the largest number of times that the digital key is validly usable, a requirement of user authentication before using the digital key, the largest number of times that one-way authentication is allowed, or the largest number of times that internal authentication is allowed.

The plurality of service-provider-specific instance CAs 451 each including operation data and a key pair for a certificate per service provider are generated for a plurality of service providers and are stored in the storage 450. The key pair for a certificate is a pair of a public key and a private key based on a symmetric key system. The service operation data may include the name of a service provider, a public key, or a root certificate of a service provider server.

The digital key data 452 is generated by the digital key manager 436 and is stored in the storage 450 upon request of the service-provider-specific service performance manager 435.

The digital key management table 453 is updated by the digital key use/access policy manager 441 whenever the digital key data 452 is generated. The digital key management table 453 may include information about an external entity authorized to access and use each digital key, requirements for using the digital key, and status information of the digital key. The external entity includes a service provider, a user application installed in an operating system (e.g., Android or iOS) of a mobile device, an external server, an electronic device manufacturer, a SE manager, a digital key application manager, or an entity having received authority of the service provider (e.g., a target entity for which the digital key is usable, such as, a vehicle, a vehicle door, a building door, or a hotel door). The requirements for using the digital key include the largest number of times that the digital key is validly usable, a requirement of user authentication before using the digital key, the largest number of times that one-way authentication is allowed, or the largest number of times that internal authentication is allowed. The status information of the digital key may include information indicating whether the digital key is locked.

Figure 5:
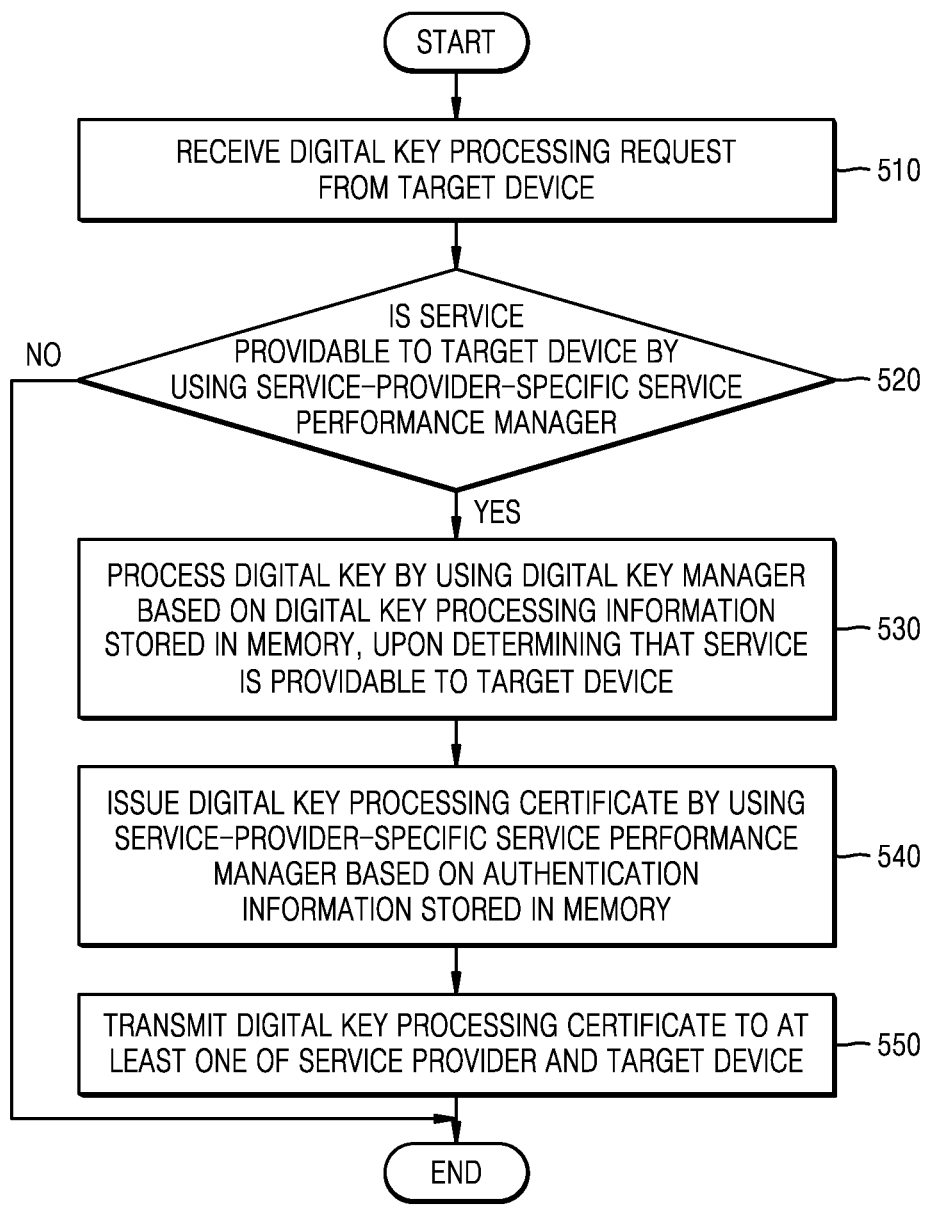
FIG. 5 is a flowchart of a method of operating a SE to process a digital key, according to an embodiment.

FIG. 5 is a flowchart of a method of operating the SE 300 to process a digital key, according to an embodiment.

Initially, in operation 510, the SE 300 receives a digital key processing request from a target device. That is, the SE 300 receives the digital key processing request for the target device from a user of the target device. Herein, the processing of the digital key may include generating, removing, or managing the digital key. Therefore, the SE 300 may receive a digital key generation request, a digital key removal request, or a digital key management request from the target device.

Then, in operation 520, the SE 300 determines whether a service is providable to the target device, by using the service-provider-specific service performance manager 435. The service-provider-specific service performance manager 435 provides digital key generation, removal, and management services per service provider, and thus may determine whether a service is providable to the target device, based on information stored in the storage 450 of the SE 300. According to an embodiment, by assigning the service-provider-specific service performance manager to provide a digital key service to service providers, and processing digital keys of the service providers via the service-provider-specific service performance manager, even when a common area is used, the SE 300 may provide independent services to the service providers.

In an embodiment, the service-provider-specific service performance manager 435 may determine whether a service is providable to the target device, by determining whether authentication information of a service provider for the target device is stored in the storage 450 of the SE 300, whether the authentication information of the service provider is valid, whether the target device is a valid target device, or whether a user of the target device is a valid user. Herein, the authentication information may include a key pair for a certificate including a public key and a private key of the service provider. In addition, the authentication information may include service operation data of the service provider including identification information of the service provider, a public key, or a root certificate of a service provider server.

Upon determining in operation 520 that a service is providable to the target device, the SE 300 proceeds to operation 530 and processes a digital key by using the digital key manager 436 based on digital key processing information stored in the storage 450 of the SE 300. The digital key manager 436 generates, removes, manages, or modifies the digital key. Herein, the digital key processing information may include attribute information including a valid time, a valid area, authority, or personal setting information for the target device. In addition, the digital key processing information may include identification information of the digital key including an ID of the digital key.

Then, in operation 540, the SE 300 issues a digital key processing certificate by using the service-provider-specific service performance manager 435 based on authentication information stored in the memory 320. The SE 300 may prove a service performance history to the service provider by issuing the certificate. The certificate issuing procedure is required to prove the service performance history to the service provider when a service using the digital key occurs regardless of a request of the service provider.

In operation 550, the SE 300 transmits the digital key processing certificate to at least one of the service provider and the target device. The SE 300 may prove the service performance history to the service provider by transmitting the certificate to the service provider and the target device, and the service provider may obtain the service performance history by receiving the certificate even when the service using the digital key occurs regardless of a request of the service provider.

In an embodiment, the SE 300 may transmit the digital key processing certificate to an entity other than the service provider and the target device, based on the authentication information and the digital key processing information. For example, the SE 300 may transmit the certificate to a charging server or a server of a third entity to perform a charging procedure through service tracking or manage keys of the third entity. Herein, the other entity may include a service provider server, an electronic device manufacturer server, a SE manager server, or a digital key application manager server.

Furthermore, when a request to integrally process digital keys of the service provider stored in the memory 320 is received in operation 510, the SE 300 may determine whether integral processing is enabled, by using the service-provider-specific service performance manager 435 in operation 520. Herein, the request to integrally process the digital keys of the service provider is a request to equally process the digital keys of the service provider and may include, for example, a request to remove, cease use of, or lock all digital keys of a specific service provider included in the SE 300. Upon determining that integral processing is enabled, the SE 300 may integrally process the digital keys of the service provider stored in the memory 320, by using the digital key manager 436 in operation 530, issue an integral processing certificate by using the service-provider-specific service performance manager 435 in operation 540, and transmit the integral processing certificate to the service provider in operation 550. In this case, the integral processing certificate may be transmitted to an entity which has requested integral processing, or to another entity when required.

According to an embodiment, by isolating the service-provider-specific service performance manager 435 for providing a digital key processing service to service providers, from the digital key manager 436 for generating, removing, managing, and modifying digital keys in the SE 300, even when a service using a digital key occurs regardless of a request of a service provider, the service using the digital key may be processed in the SE 300 and then a certificate capable of proving a service performance history may be issued and transmitted to the service provider by using the service-provider-specific service performance manager, thereby integrally managing and synchronizing all services without direct involvement of the service providers.

Figure 6:
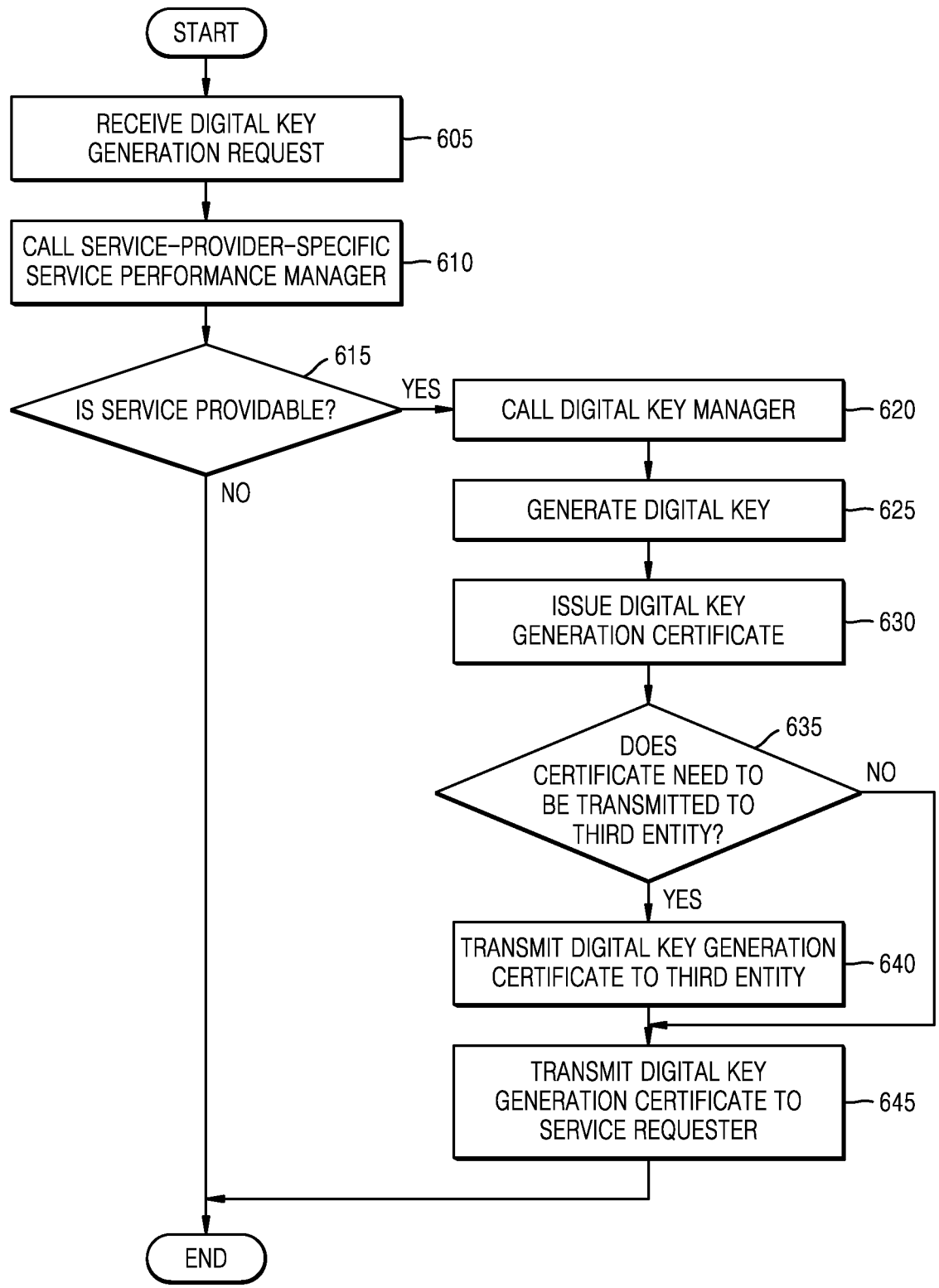
FIG. 6 is a flowchart of a method of operating a SE to generate a digital key, according to an embodiment.

FIG. 6 is a flowchart of a method of operating the SE 300 to generate a digital key, according to an embodiment.

Initially, in operation 605, the SE 300 receives a digital key generation request from an external service requester. In this case, the SE 300 may receive the digital key generation request of the external service requester via a target device. In operation 610, the SE 300 interprets the received command by using the command processor 432, and calls the service-provider-specific service performance manager 435.

In operation 615, the service-provider-specific service performance manager 435 determines whether a service is providable to the service requester. The service-provider-specific service performance manager 435 may determine whether a service is providable, based on the instance CA 451 for a corresponding service provider. Specifically, when service operation data of the service provider and a key pair for a certificate are stored in the storage 450 of the SE 300, the service-provider-specific service performance manager 435 may determine that a service is providable. Furthermore, the service-provider-specific service performance manager 435 may determine whether a service is providable to the target device, by determining whether the service operation data of the service provider and the key pair for a certificate are valid, whether the target device is a valid target device, or whether a user of the target device is a valid user.

Upon determining in operation 615 that a service is not providable, the procedure is terminated immediately.

Upon determining in operation 615 that a service is providable, the SE 300 proceeds to operation 620 and calls the digital key manager 436 to generate a digital key by using the service-provider-specific service performance manager 435. Then, in operation 625, the digital key manager 436 generates the digital key based on digital key generation information. The digital key generation information may include identification information of the digital key, and attribute information. Herein, the attribute information may include a valid time, a valid area, or permitted authority (e.g., in regard to a vehicle, door opening, trunk opening, and engine starting) of the digital key. In addition, the attribute information may include a nickname assigned to the generated digital key, and setting information of a user of the digital key (e.g., in regard to a vehicle, personal vehicle setting information such as a preferred seat position, a rear-view mirror position, and preferred radio channels). The digital key manager 436 stores the digital key data 452 of the generated digital key in the storage 450.

In operation 630, the service-provider-specific service performance manager 435 generates a digital key generation certificate proving that the digital key is successfully generated, and issues the digital key generation certificate by adding a signature thereto by using a private key for the service provider.

Then, in operation 635, the service-provider-specific service performance manager 435 determines whether the issued digital key generation certificate needs to be transmitted to a third entity other than the service requester. For example, the SE 300 may transmit the certificate to a charging server or a server of a third entity to perform a charging procedure through service tracking or manage keys of the third entity. The service-provider-specific service performance manager 435 may determine whether the digital key generation certificate needs to be transmitted to the third entity other than the service requester, based on the service operation data per service provider or the digital key data 452 of the generated digital key. For example, the SE 300 may transmit the certificate to a charging server or a server of a third entity to perform a charging procedure through service tracking or manage keys of the third entity. Herein, the third entity may include a service provider server, an electronic device manufacturer server, a SE manager server, or a digital key application manager server.

Upon determining in operation 635 that the digital key generation certificate needs to be transmitted to the third entity other than the service requester, the SE 300 proceeds to operation 640 and transmits the digital key generation certificate to the target entity. Then, in operation 645, the SE 300 transmits the digital key generation certificate to the service requester.

Upon determining in operation 635 that the digital key generation certificate does not need to be transmitted to the third entity other than the service requester, the SE 300 proceeds directly to operation 645 and transmits the digital key generation certificate to the service requester. The order of operations 635 and 640 and operation 645 may be reversed.

The method of operating the SE 300 to generate the digital key has been described above in relation to FIG. 6, and a method of operating the SE 300 to remove a digital key will now be described in relation to FIG. 7.

Figure 7:
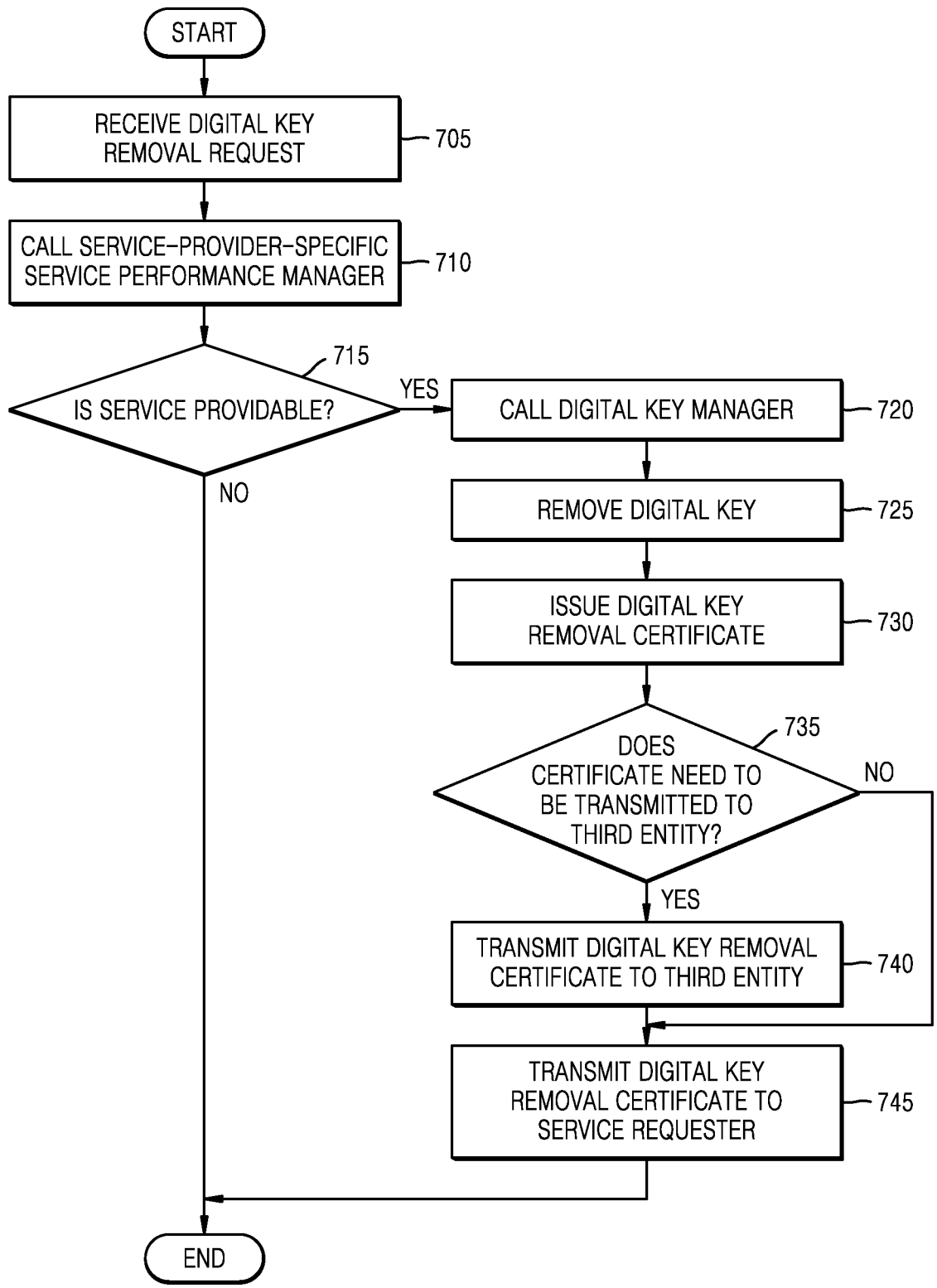
FIG. 7 is a flowchart of a method of operating a SE to remove a digital key, according to an embodiment.

FIG. 7 is a flowchart of a method of operating the SE 300 to remove a digital key, according to an embodiment.

Initially, in operation 705, the SE 300 receives a digital key removal request from an external service requester. In this case, the SE 300 may receive the digital key removal request of the external service requester via a target device. In operation 710, the SE 300 interprets the received command by using the command processor 432, and calls the service-provider-specific service performance manager 435.

In operation 715, the service-provider-specific service performance manager 435 determines whether a service is providable to the service requester. The service-provider-specific service performance manager 435 may determine whether a service is providable, based on the instance CA 451 for a corresponding service provider. Specifically, when service operation data of the service provider and a key pair for a certificate are stored in the storage 450 of the SE 300, the service-provider-specific service performance manager 435 may determine that a service is providable. Furthermore, the service-provider-specific service performance manager 435 may determine whether a service is providable to the target device, by determining whether the service operation data of the service provider and the key pair for a certificate are valid, whether the target device is a valid target device, or whether a user of the target device is a valid user.

Upon determining in operation 715 that a service is not providable, the procedure is terminated immediately.

Upon determining in operation 715 that a service is providable, the SE 300 proceeds to operation 720 and calls the digital key manager 436 to remove a digital key by using the service-provider-specific service performance manager 435. Then, in operation 725, the digital key manager 436 removes the digital key based on digital key removal information. Then, the digital key manager 436 may transmit a digital key removal result value to the service-provider-specific service performance manager 435. In an embodiment, the removal result value may include information indicating whether removal is successfully performed, identification information of the removed digital key, or a public key of the removed digital key.

In operation 730, the service-provider-specific service performance manager 435 generates a digital key removal certificate proving that the digital key is successfully removed, and issues the digital key removal certificate by adding a signature thereto by using a private key for the service provider. The digital key removal certificate may include the digital key removal result value received in operation 725.

Then, in operation 735, the service-provider-specific service performance manager 435 determines whether the issued digital key removal certificate needs to be transmitted to a third entity other than the service requester. For example, the SE 300 may transmit the certificate to a charging server or a server of a third entity to perform a charging procedure through service tracking or manage keys of the third entity. The service-provider-specific service performance manager 435 may determine whether the digital key removal certificate needs to be transmitted to the third entity other than the service requester, based on the service operation data per service provider or the digital key data 452 of the removed digital key. For example, the SE 300 may transmit the certificate to a charging server or a server of a third entity to perform a charging procedure through service tracking or manage keys of the third entity.

Herein, the third entity may include a service provider server, an electronic device manufacturer server, a SE manager server, or a digital key application manager server.

Upon determining in operation 735 that the digital key removal certificate needs to be transmitted to the third entity other than the service requester, the SE 300 proceeds to operation 740 and transmits the digital key removal certificate to the target entity. Then, in operation 745, the SE 300 transmits the digital key removal certificate to the service requester. The order of operations 735 and 740 and operation 745 may be reversed.

Upon determining in operation 735 that the digital key removal certificate does not need to be transmitted to the third entity other than the service requester, the SE 300 proceeds directly to operation 745 and transmits the digital key removal certificate to the service requester.

The method of operating the SE 300 to remove the digital key has been described above in relation to FIG. 7, and a method of operating the SE 300 to integrally process digital keys will now be described in relation to FIG. 8.

Figure 8:
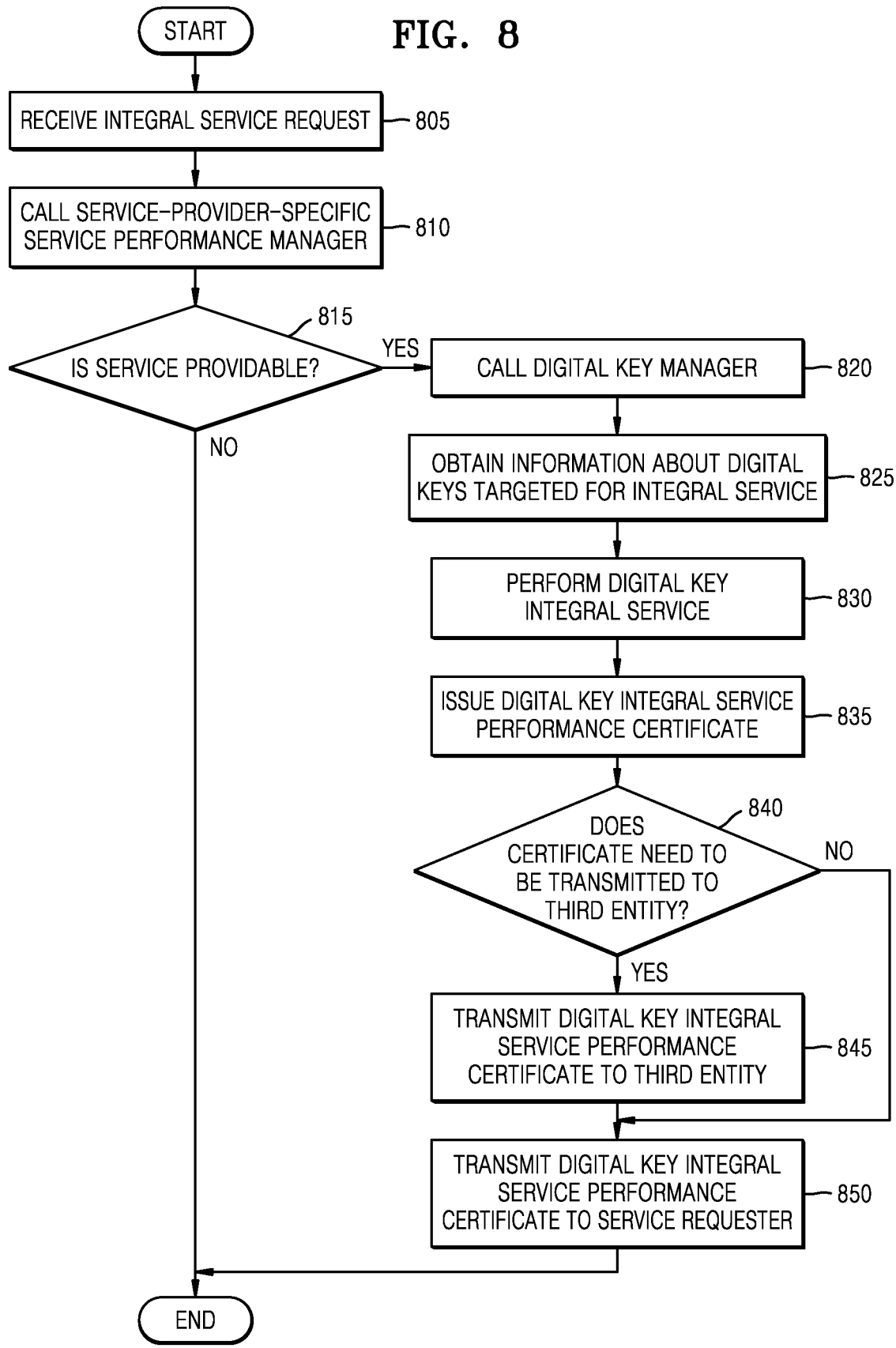
FIG. 8 is a flowchart of a method of operating a SE to integrally process digital keys, according to an embodiment.

FIG. 8 is a flowchart of a method of operating the SE 300 to integrally process digital keys, according to an embodiment.

Initially, in operation 805, the SE 300 receives an integral service request from an external service requester. In this case, the SE 300 may receive the integral service request of the external service requester via a target device. Herein, the integral service request is a request to equally process digital keys of a corresponding service provider, and an integral service is not a service for individually managing a specific digital key but is a service-provider-specific service for integrally managing the digital keys of the service provider stored in the SE 300. For example, the integral service request may include a request to remove, cease use of, or lock all digital keys of a specific service provider included in the SE 300.

In operation 810, the SE 300 interprets the received command by using the command processor 432, and calls the service-provider-specific service performance manager 435.

In operation 815, the service-provider-specific service performance manager 435 determines whether an integral service is providable to the service requester. The service-provider-specific service performance manager 435 may determine whether an integral service is providable, based on the instance CA 451 for the service provider. Specifically, when service operation data of the service provider and a key pair for a certificate are stored in the storage 450 of the SE 300, the service-provider-specific service performance manager 435 may determine that an integral service is providable. Furthermore, the service-provider-specific service performance manager 435 may determine whether an integral service is providable to the target device, by determining whether the service operation data of the service provider and the key pair for a certificate are valid, whether the target device is a valid target device, or whether a user of the target device is a valid user.

Upon determining in operation 815 that an integral service is not providable, the procedure is terminated immediately.

Upon determining in operation 815 that an integral service is providable, the SE 300 proceeds to operation 820 and calls the digital key manager 436 to provide the integral service by using the service-provider-specific service performance manager 435. Then, in operation 825, the digital key manager 436 obtains information about digital keys targeted for the integral service. The information about the digital keys targeted for the integral service may be obtained by searching the digital key management table 453 by using the digital key use/access policy manager 441, or be obtained together with the service operation data per service provider and the key pair for a certificate.

In operation 830, the digital key manager 436 performs the integral service on the digital keys. For example, the digital key manager 436 may remove or lock the digital keys targeted for the integral service. To remove the digital keys targeted for the integral service, data of the digital keys targeted for the integral service may be removed from the storage 450. To lock the digital keys targeted for the integral service, status information of the digital keys included in the digital key management table 453 may be changed to a locked status.

The digital key manager 436 may transmit a digital key integral service performance result value to the service-provider-specific service performance manager 435. In an embodiment, the performance result value may include information indicating whether the integral service is successfully performed, identification information of the removed or locked digital keys, or public keys of the removed or locked digital keys.

In operation 835, the service-provider-specific service performance manager 435 generates a digital key integral service performance certificate proving that the integral service is successfully performed, and issues the digital key integral service performance certificate by adding a signature thereto by using a private key for the service provider. The digital key integral service performance certificate may include the digital key integral service performance result value received in operation 830.

Then, in operation 840, the service-provider-specific service performance manager 435 determines whether the issued digital key integral service performance certificate needs to be transmitted to a third entity other than the service requester. For example, the SE 300 may transmit the certificate to a charging server or a server of a third entity to perform a charging procedure through service tracking or manage keys of the third entity. The service-provider-specific service performance manager 435 may determine whether the digital key integral service performance certificate needs to be transmitted to the third entity other than the service requester, based on the service operation data per service provider or the digital key data 452 of the generated digital keys. For example, the SE 300 may transmit the certificate to a charging server or a server of a third entity to perform a charging procedure through service tracking or manage keys of the third entity. Herein, the third entity may include a service provider server, an electronic device manufacturer server, a SE manager server, or a digital key application manager server.

Upon determining in operation 840 that the digital key integral service performance certificate needs to be transmitted to the third entity other than the service requester, the SE 300 proceeds to operation 845 and transmits the digital key integral service performance certificate to the target entity. Then, in operation 850, the SE 300 transmits the digital key integral service performance certificate to the service requester.

Upon determining in operation 840 that the digital key integral service performance certificate does not need to be transmitted to the third entity other than the service requester, the SE 300 proceeds directly to operation 850 and transmits the digital key integral service performance certificate to the service requester.

Figure 9:
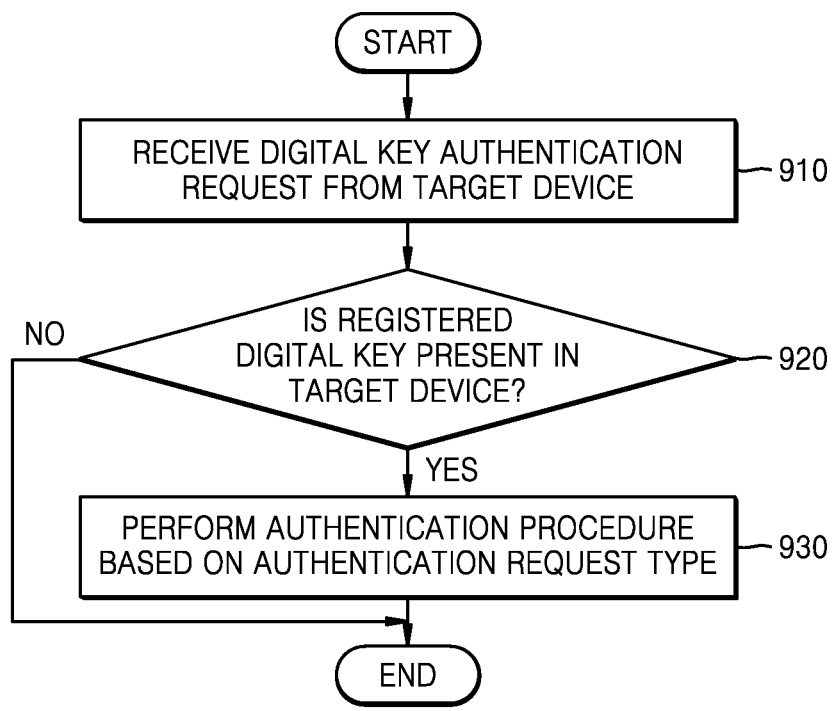
FIG. 9 is a flowchart of a method of operating a SE to authenticate a digital key, according to an embodiment.

FIG. 9 is a flowchart of a method of operating the SE 300 to authenticate a digital key, according to an embodiment.

Initially, in operation 910, the SE 300 receives a digital key authentication request from a target device. In an embodiment, the authentication request may include types such as fast transaction, standard transaction, internal authentication, and mutual authentication.

Then, in operation 920, the SE 300 determines whether a registered digital key is present in the target device. Specifically, the SE 300 determines whether a digital key usable for an authentication procedure is present. In an embodiment, the SE 300 may determine whether a registered digital key is present in the target device, by using the digital key use determiner 437. In this case, the digital key use determiner 437 may determine whether a registered digital key is present in the target device, based on data included in the digital key management table 453. For example, when identification information of a service requester is given, the digital key use determiner 437 may search for a digital key corresponding to the identification information of the service requester.

Upon determining in operation 920 that a usable digital key is not present, the procedure is terminated immediately. In this case, a message indicating that authentication is not performable and a reason thereof may be transmitted to the service requester.

Upon determining in operation 920 that a registered digital key is present in the target device, the digital key use determiner 437 may additionally determine a status of the digital key to determine whether the digital key is usable. For example, the digital key use determiner 437 may determine the status of the digital key based on status information included in the digital key management table 453. Herein, the status information may include information indicating whether the digital key is locked. In addition, the status information may include information about security validity of the digital key and a valid duration of the digital key.

Lastly, in operation 930, the SE 300 perform an authentication procedure based on an authentication request type upon determining that a registered digital key is present in the target device. In an embodiment, when the digital key authentication request received from the target device is a one-way authentication request, the SE 300 may determine whether one-way authentication is performable, and perform one-way authentication upon determining that one-way authentication is performable. In an embodiment, the SE 300 may determine whether one-way authentication is performable, by using the digital key use determiner 437. The digital key use determiner 437 may determine whether one-way authentication is performable, based on status information included in the digital key management table 453. Herein, the status information may include information indicating whether the digital key is locked. In addition, the status information may include the number of times that one-way authentication is performed, the number of times that one-way authentication is performable, or information indicating whether one-way authentication is locked.

In an embodiment, the digital key use determiner 437 may check an additional condition of use to determine whether to continue the authentication procedure. Herein, the additional condition of use may include a condition on whether user authentication is performed before performing authentication. User authentication may be performed by inputting a personal identification number (PIN) or biometric data.

The SE 300 may determine whether two-way authentication is performable, upon determining that one-way authentication is not performable, and transmit a two-way authentication request to the target device upon determining that two-way authentication is performable. In an embodiment, the SE 300 may determine whether two-way authentication is performable, by using the digital key use determiner 437. The digital key use determiner 437 may determine whether two-way authentication is performable, based on status information included in the digital key management table 453. Herein, the status information may include information indicating whether the digital key is locked. In addition, the status information may include information about security validity of the digital key and a valid duration of the digital key.

Furthermore, the SE 300 may perform user authentication, and stop the authentication procedure when user authentication fails. In an embodiment, the SE 300 may request the service framework 410 to perform user authentication and then receive a user authentication result from the service framework 410. Herein, user authentication may be performed in any stage during the authentication procedure. For example, upon determining in operation 920 that a registered digital key is present and the digital key is usable, user authentication may be performed to stop or continue the authentication procedure.

According to an embodiment, when a service such as authentication is to be used by using a digital key, an optimized authentication service may be provided by proactively determining requirements for using the digital key.

Figure 10:
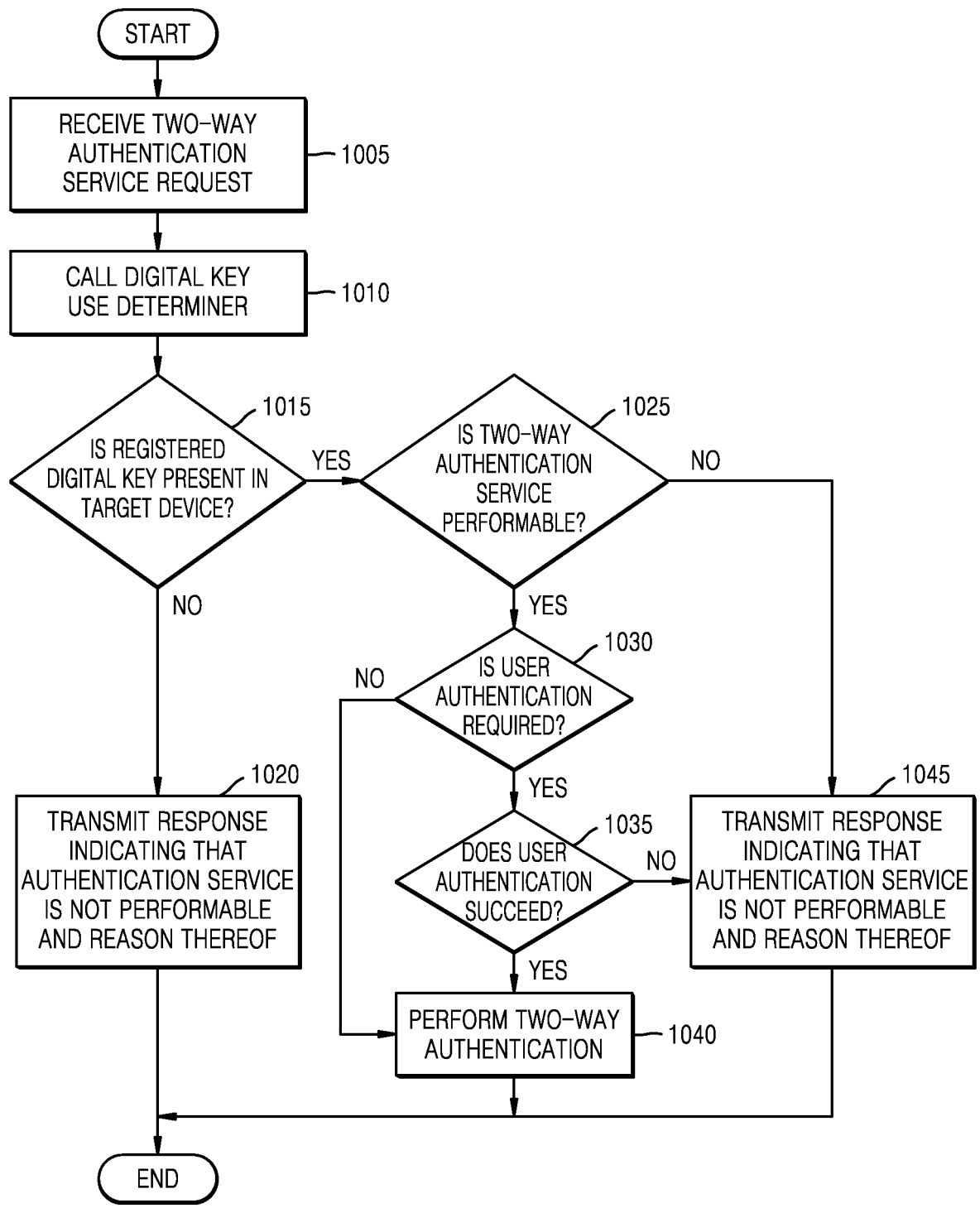
FIG. 10 is a flowchart of a method of operating a SE to two-way-authenticate a digital key, according to an embodiment.

FIG. 10 is a flowchart of a method of operating the SE 300 to two-way-authenticate a digital key, according to an embodiment.

Initially, in operation 1005, the SE 300 receives a two-way authentication service request using a digital key from an external service requester. Herein, the authentication service request may include types such as standard transaction and mutual authentication. Then, in operation 1010, the SE 300 calls the digital key use determiner 437.

In operation 1015, the digital key use determiner 437 determines whether a digital key usable for two-way authentication is present. The digital key use determiner 437 may determine whether a registered digital key is present in a target device, based on data included in the digital key management table 453. For example, when identification information of the service requester is given, the digital key use determiner 437 may search for a digital key corresponding to the identification information of the service requester.

Upon determining in operation 1015 that a registered digital key is not present in the target device, the procedure proceeds to operation 1020 to transmit, to the service requester, a response indicating that the authentication service is not performable and a reason thereof, and then is terminated immediately.

Upon determining in operation 1015 that a registered digital key is present in the target device, the procedure proceeds to operation 1025 and the digital key use determiner 437 determines whether the requested two-way authentication service is performable using the digital key. The digital key use determiner 437 may determine a status of the digital key based on status information included in the digital key management table 453. Herein, the status information may include information indicating whether the digital key is locked. In addition, the status information may include information about security validity of the digital key and a valid duration of the digital key.

Upon determining in operation 1025 that the requested two-way authentication service is performable using the digital key, the digital key use determiner 437 proceeds to operation 1030 and determines whether an additional condition of use is applied to the digital key. In an embodiment, the digital key use determiner 437 may check the additional condition of use to determine whether to continue the authentication procedure. Herein, the additional condition of use may include a condition on whether user authentication is performed before performing authentication. User authentication may be performed by inputting a PIN number or biometric data. However, operation 1030 is not essential and the authentication procedure may be performed without, for example, determining whether user authentication is performed. Although whether user authentication is performed is determined in operation 1030 of FIG. 10, user authentication is not limited thereto and may be performed in any stage during the authentication procedure. For example, user authentication may be performed before operation 1015 for determining whether a registered digital key is present in the target device.

Upon determining in operation 1030 that user authentication is required, the digital key use determiner 437 may proceed to operation 1035, and request the service framework 410 to perform user authentication and then receive a user authentication result from the service framework 410. When user authentication succeeds in operation 1035, the procedure proceeds to operation 1040 to perform two-way authentication. Specifically, authentication response information for two-way authentication may be generated. In an embodiment, the generating of the authentication response information includes performing a security operation by using a private key of a specific digital key. Herein, the security operation may include signature, encryption, calculation of a session key, encryption using the calculated session key, or calculation of a MAC key by using the calculated session key.

Upon determining in operation 1030 that user authentication is not required, operation 1035 may be skipped and the procedure may proceed directly to operation 1040 to perform two-way authentication.

Upon determining in operation 1025 that the requested two-way authentication service is not performable using the digital key, or when user authentication fails in operation 1035, the procedure may proceed to operation 1045 to transmit, to the service requester, a response indicating that the authentication service is not performable and a reason thereof.

FIG. 11 is a flowchart of a method of operating the SE 300 to one-way-authenticate a digital key, according to an embodiment.

Initially, in operation 1105, the SE 300 receives a one-way authentication service request using a digital key from an external service requester. Herein, the authentication service request may include types such as fast transaction and internal authentication. Then, in operation 1110, the SE 300 calls the digital key use determiner 437.

In operation 1115, the digital key use determiner 437 determines whether a digital key usable for one-way authentication is present. The digital key use determiner 437 may determine whether a registered digital key is present in a target device, based on data included in the digital key management table 453. For example, when identification information of the service requester is given, the digital key use determiner 437 may search for a digital key corresponding to the identification information of the service requester.

Upon determining in operation 1115 that a registered digital key is not present in the target device, the procedure proceeds to operation 1120 to transmit, to the service requester, a response indicating that the authentication service is not performable and a reason thereof, and then is terminated immediately.

Upon determining in operation 1115 that a registered digital key is present in the target device, the procedure proceeds to operation 1125 and the digital key use determiner 437 determines whether the requested one-way authentication service is performable using the digital key. The digital key use determiner 437 may determine a status of the digital key based on status information included in the digital key management table 453. Herein, the status information may include information indicating whether the digital key is locked. In addition, the status information may include the number of times that one-way authentication is performed, the number of times that one-way authentication is performable, or information indicating whether one-way authentication is locked.

Upon determining in operation 1125 that the requested one-way authentication service is performable using the digital key, the digital key use determiner 437 proceeds to operation 1130 and determines whether an additional condition of use is applied to the digital key. In an embodiment, the digital key use determiner 437 may check the additional condition of use to determine whether to continue the authentication procedure. Herein, the additional condition of use may include a condition on whether user authentication is performed before performing authentication. User authentication may be performed by inputting a PIN number or biometric data. However, operation 1130 is not essential and the authentication procedure may be performed without, for example, determining whether user authentication is performed. Although whether user authentication is performed is determined in operation 1130 of FIG. 11, user authentication is not limited thereto and may be performed in any stage during the authentication procedure. For example, user authentication may be performed before operation 1115 for determining whether a registered digital key is present in the target device.

Upon determining in operation 1130 that user authentication is required, the digital key use determiner 437 may proceed to operation 1135, and request the service framework 410 to perform user authentication and then receive a user authentication result from the service framework 410. When user authentication succeeds in operation 1105, the procedure proceeds to operation 1140 to perform one-way authentication. Specifically, authentication response information for one-way authentication may be generated. In an embodiment, the generating of the authentication response information includes performing a security operation by using specific information. Herein, the specific information may be common information generated in a two-way digital key authentication procedure previously performed with the service requester. In addition, the security operation may include signature, encryption, encryption using the specific information, calculation of a MAC key by using the specific information, or generation of a challenge response by using the specific information.

Upon determining in operation 1130 that user authentication is not required, operation 1135 may be skipped and the procedure may proceed directly to operation 1140 to perform one-way authentication.

When user authentication fails in operation 1135, the procedure may proceed to operation to transmit, to the service requester, a response indicating that the authentication service is not performable and a reason thereof.

Upon determining in operation 1125 that the requested one-way authentication service is not performable using the digital key, the digital key use determiner 437 proceeds to operation 1145 and determines whether a two-way authentication service is performable. In an embodiment, the digital key use determiner 437 may determine whether the two-way authentication service is performable, based on status information included in the digital key management table 453. Herein, the status information may include information indicating whether the digital key is locked. In addition, the status information may include information about security validity of the digital key and a valid duration of the digital key.

Upon determining in operation 1145 that the two-way authentication service is performable, the procedure proceeds to operation 1155 and the digital key use determiner 437 transmits, to the service requester, a response indicating that the one-way authentication service is not performable, together with a two-way authentication service request.

Upon determining in operation 1145 that the two-way authentication service is not performable, the digital key use determiner 437 may proceed to operation to transmit, to the service requester, a response indicating that the authentication service is not performable and a reason thereof.

Meanwhile, the afore-described embodiments may be written as programs executable on a computer, and be implemented by a general-purpose digital computer for operating the programs by using a computer-readable medium. Data structures used in the afore-described embodiments may be recorded on the computer-readable medium via a variety of means. The afore-described embodiments may be implemented in the form of a recording medium including instructions executable by the computer, e.g., a program module executed by the computer. For example, methods implemented by software modules or algorithms may be stored in a computer-readable medium as computer-readable and computer-executable codes or program instructions.

The computer-readable medium may be an arbitrary recording medium accessible by the computer, and examples thereof may include volatile, non-volatile, detachable, and non-detachable media. Examples of the computer-readable medium include magnetic storage media (e.g., read-only memory (ROM), floppy disks, and hard disks) and optical recording media (e.g., compact disc-ROM (CD-ROM) and digital versatile discs (DVDs)), but are not limited thereto. The computer-readable medium may include a computer storage medium and a communication medium.

A plurality of computer-readable recording media may be distributed over network-coupled computer systems, and data, e.g., program instructions and codes, stored in the distributed recording media may be executed by at least one computer.

While the disclosure has been particularly shown and described with reference to embodiments thereof, it will be understood by one of ordinary skill in the art that various changes in form and details may be made therein without departing from the scope of the disclosure. Therefore, it should be understood that the afore-described embodiments are illustrative in all aspects and do not limit the disclosure.

The invention claimed is:

1. A secure element (SE) for running a digital key application to process a digital key, the SE comprising:
a memory for storing programs and a plurality of instance certificate authorities (CAs) corresponding to the digital key application, wherein each of the plurality of instance CAs includes a key pair for a service provider and is used for a different service provider; and
at least one processor for executing the programs stored in the memory, wherein the at least one processor is configured to:
receive a digital key processing request related to an external entity from a service framework, wherein the external entity is a target device or a server related to the service provider,
determine whether a digital key service is providable to the external entity,
process the digital key based on digital key processing information, upon determining that the digital key service is providable to the external entity,
generate a digital key processing certificate based on authentication information, and
provide the digital key processing certificate to the service framework.

2. The SE of claim 1, wherein processing the digital key comprises at least one of generating or managing the digital key.

3. The SE of claim 1, wherein the at least one processor is further configured to determine whether the digital key service is providable to the external entity, based on at least one of:
whether an instance CA corresponding to the service provider for the external entity is stored in the SE, whether a key pair for a certificate including a public key and a private key of the service provider is stored in the SE, whether identification information of the digital key is stored in the SE, whether identification information of the target device is stored in the SE, whether certification information of the service provider is valid, or whether the target device is a valid target device.

4. The SE of claim 1, wherein the digital key processing information includes at least one of identification information of the target device, a valid time, or identification information of the digital key, and
wherein an instance CA corresponding to the service provider comprises a key pair for a certificate including a public key and a private key of the service provider.

5. The SE of claim 1, wherein the service framework is configured to provide the digital key processing certificate to at least one of the external entity or an entity other than the external entity.

6. The SE of claim 1, wherein, when a request to integrally process digital keys of the service provider stored in the memory is received, the at least one processor is further configured to:
determine whether integral processing is enabled,
integrally process the digital keys of the service provider stored in the memory upon determining that integral processing is enabled,
issue an integral processing certificate, and
transmit the integral processing certificate to the service provider.

7. The SE of claim 1, wherein the at least one processor is further configured to:
receive a digital key authentication request from the target device,
determine whether a registered digital key is present in the target device, and
perform an authentication procedure based on an authentication request type upon determining that the registered digital key is present in the target device.

8. The SE of claim 7, wherein, in case that the digital key authentication request received from the target device is a one-way authentication request, the at least one processor is further configured to:
  determine whether one-way authentication is performable, and
  perform one-way authentication upon determining that one-way authentication is performable.

9. The SE of claim 7, wherein the authentication request type includes at least one of a type for standard transaction, or a type for fast transaction.

10. The SE of claim 7, wherein the at least one processor is further configured to:
  determine whether user authentication is performed, and
  in case that the user authentication is not performed, terminate the authentication procedure.

11. A method, performed by a secure element (SE), for running a digital key application to process a digital key, the method comprising:
  receiving a digital key processing request related to an external entity from a service framework, wherein the external entity is a target device or a server related to a service provider;
  determining whether a digital key service is providable to the external entity, wherein the SE includes a plurality of instance certificate authorities (CAs) corresponding to the digital key application, and wherein each of the plurality of instance CAs includes a key pair for the service provider and is used for a different service provider;
  processing the digital key based on digital key processing information, upon determining that the digital key service is providable to the external entity;
  generating a digital key processing certificate based on authentication information; and
  providing the digital key processing certificate to the service framework.

12. The method of claim 11, wherein processing the digital key comprises at least one of generating or managing the digital key.

13. The method of claim 11, wherein determining whether the digital key service is providable to the external entity comprises:
  determining at least one of whether an instance CA corresponding to the service provider for the external entity is stored in the SE, whether a key pair for a certificate including a public key and a private key of the service provider is stored in the SE, whether identification information of the digital key is stored in the SE, whether identification information of the target device is stored in the SE, whether certification information of the service provider is valid, or whether the target device is a valid target device.

14. The method of claim 11, wherein the digital key processing information includes at least one of identification information of the target device, a valid time, or identification information of the digital key, and
  wherein an instance CA corresponding to the service provider comprises a key pair for a certificate including a public key and a private key of the service provider.

15. The method of claim 11, wherein the service framework is configured to provide the digital key processing certificate to at least one of the external entity or an entity other than the external entity.

16. The method of claim 11, wherein, when a request to integrally process digital keys of the service provider stored in a memory of the SE is received, the method further comprises:
  determining whether integral processing is enabled;
  integrally processing the digital keys of the service provider upon determining that integral processing is enabled;
  issuing an integral processing certificate; and
  transmitting the integral processing certificate to the service provider.

17. The method of claim 11, further comprising:
  receiving a digital key authentication request from the target device,
  determining whether a registered digital key is present in the target device, and
  performing an authentication procedure based on an authentication request type upon determining that the registered digital key is present in the target device.

18. The method of claim 17, wherein the authentication request type includes at least one of a type for standard transaction, or a type for fast transaction.

19. The method of claim 17, further comprising:
  determining whether user authentication is performed, and
  in case that the user authentication is not performed, terminating the authentication procedure.

20. The method of claim 17, further comprising:
  in case that the digital key authentication request received from the target device is a one- way authentication request:
  determining whether one-way authentication is performable, and
  performing the one-way authentication upon determining that the one-way authentication is performable.

* * * * *